United States Patent
Lee et al.

(10) Patent No.: US 10,327,263 B2
(45) Date of Patent: Jun. 18, 2019

(54) METHOD AND APPARATUS FOR TRANSMITTING SCHEDULING REQUEST USING CONTENTION-BASED RESOURCES IN WIRELESS COMMUNICATION SYSTEM

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 15/119,115

(22) PCT Filed: Feb. 16, 2015

(86) PCT No.: PCT/KR2015/001571
§ 371 (c)(1),
(2) Date: Aug. 15, 2016

(87) PCT Pub. No.: WO2015/122739
PCT Pub. Date: Aug. 20, 2015

(65) Prior Publication Data
US 2017/0055294 A1    Feb. 23, 2017

Related U.S. Application Data

(60) Provisional application No. 61/940,475, filed on Feb. 16, 2014, provisional application No. 62/004,213, filed on May 29, 2014.

(51) Int. Cl.
*H04W 74/08* (2009.01)
*H04W 72/12* (2009.01)
*H04W 28/02* (2009.01)

(52) U.S. Cl.
CPC ... *H04W 74/0833* (2013.01); *H04W 72/1284* (2013.01); *H04W 28/0278* (2013.01)

(58) Field of Classification Search
CPC . H04W 28/02; H04W 28/0278; H04W 72/12; H04W 72/1284; H04W 74/08; H04W 74/0833
See application file for complete search history.

(56) References Cited

U.S. PATENT DOCUMENTS 8,929,319 B2 * 1/2015 Anderson ......... H04W 72/1284
                                                      370/329
9,277,514 B2 * 3/2016 Zhang ................... H04W 52/50
(Continued)

FOREIGN PATENT DOCUMENTS

| JP | 2011155334 | 8/2011 |
| JP | 2013516815 | 5/2013 |
| WO | 2011019813 | 2/2011 |
| WO | 2014005284 | 1/2014 |

OTHER PUBLICATIONS

PCT International Application No. PCT/KR2015/001571, Written Opinion of the International Searching Authority dated May 21, 2015, 12 pages.

*Primary Examiner* — Tri H Phan
(74) *Attorney, Agent, or Firm* — Lee, Hong, Degerman, Kang & Waimey

(57) ABSTRACT

The present invention relates to a wireless communication system. In detail, the present invention is a method for transmitting a scheduling request (SR) by a user equipment (UE) in a wireless communication system includes: receiving information on a resource for the scheduling request (SR) from a base station (BS); transmitting the scheduling request (SR) using the scheduling request (SR) resource transmitted over a control channel; and transmitting a first buffer status report (BSR) using uplink (UL) contention-based resources transmitted over a data channel. The UL (Continued)

(a)

(b)

contention-based resources are determined based on at least one of the resource for the scheduling request (SR) or an identifier (ID) of the UE.

18 Claims, 23 Drawing Sheets

(56) References Cited

U.S. PATENT DOCUMENTS

| | | | |
|---|---|---|---|
| 10,149,320 B2* | 12/2018 | Baldemair | H04W 8/186 |
| 2011/0039568 A1* | 2/2011 | Zhang | H04W 52/50 |
| | | | 455/452.1 |
| 2011/0263286 A1* | 10/2011 | Damnjanovic | H04W 74/008 |
| | | | 455/513 |
| 2011/0292895 A1* | 12/2011 | Wager | H04L 5/0007 |
| | | | 370/329 |
| 2012/0014269 A1* | 1/2012 | Ray | H04W 74/006 |
| | | | 370/252 |
| 2012/0236816 A1 | 9/2012 | Park et al. | |
| 2012/0263095 A1 | 10/2012 | Quan et al. | |
| 2012/0275381 A1* | 11/2012 | Kim | H04W 74/08 |
| | | | 370/328 |
| 2012/0300744 A1 | 11/2012 | Larmo et al. | |
| 2013/0022012 A1 | 1/2013 | Lee et al. | |
| 2013/0163535 A1 | 6/2013 | Anderson et al. | |
| 2013/0163537 A1* | 6/2013 | Anderson | H04W 72/1284 |
| | | | 370/329 |
| 2017/0374677 A1* | 12/2017 | Lee | H04W 12/08 |

* cited by examiner

FIG. 2
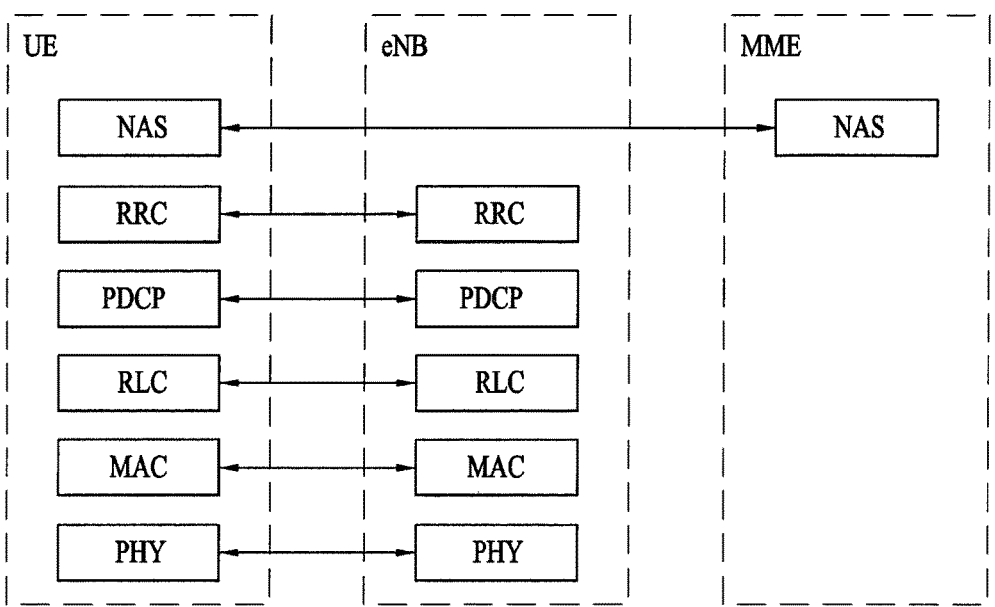
(a) Control - Plane Protocol Stack
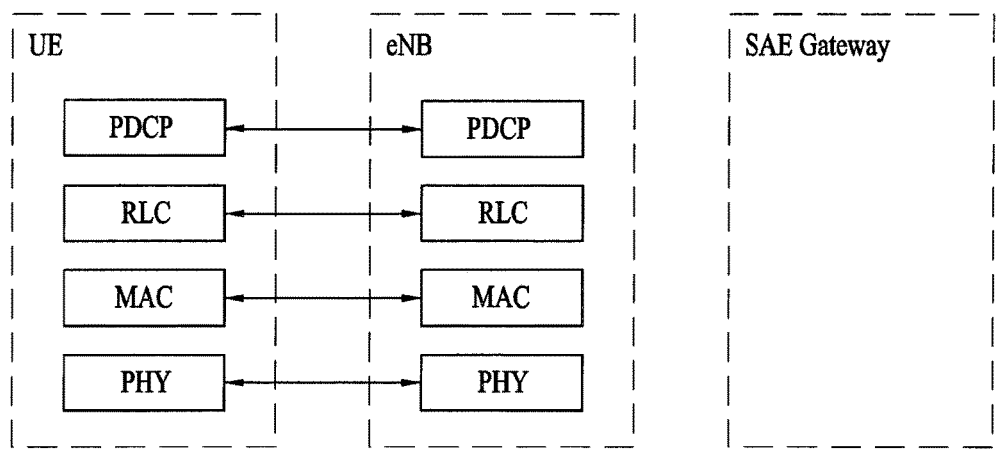
(b) User - Plane Protocol Stack PUCCH format 1a and 1b structure (normal CP case)

PUCCH format 1a and 1b structure (normal CP case)

PUCCH format 2, 2a and 2b (normal CP case)

PUCCH format 2, 2a and 2b (extended CP case)

FIG. 11

Resource allocation: 18 ACK/NACK channels in normal CP case $\Delta_{shift}^{PUCCH} = 2$

| cell specific circular shift offset | | orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n'=0 | | 12 | n'=0 | | 12 |
| 2 | 1 | 1 | 6 | 13 | 1 | 6 | 13 |
| 3 | 2 | 2 | 7 | 14 | 2 | 7 | 14 |
| 4 | 3 | 3 | 8 | 15 | 3 | 8 | 15 |
| 5 | 4 | 4 | 9 | 16 | 4 | 9 | 16 |
| 6 | 5 | 5 | 10 | 17 | 5 | 10 | 17 |
| 7 | 6 | | 11 | | | 11 | |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{ \{1,2,3\}$ normal CP case, $\{1,2,3\}$ extended CP case $\delta_{offset}^{PUCCH} \in \{0,1,...,\Delta_{shift}^{PUCCH} - 1\}$ cell specific circular shift offset $n_{OC}$ — orthogonal sequence index for ACK/NACK
$\bar{n}_{OC}$ — orthogonal sequence index for RS
$n_{CS}$ — cell-specific circular shift value of CAZAC sequence
         circular shift value of CAZAC sequence
n' — ACK/NACK resource index used for channelization in RB

FIG. 13

☐ PRBs used for PUCCH transmission in slot $n_s$ $$n_{PRB} = \begin{cases} \left\lfloor \dfrac{m}{2} \right\rfloor & \text{if } (m+n_s \bmod 2) \bmod 2 = 0 \\ N_{RB}^{UL} - 1 - \left\lfloor \dfrac{m}{2} \right\rfloor & \text{if } (m+n_s \bmod 2) \bmod 2 = 1 \end{cases}$$

· mapping order :
RBs on outer boundary to RBs on inner boundary
PUCCH format 2/2a/2b first
· combined ACK/NACK and CQI format
· PUCCH format 1/1a/1b $n_{PRB} = N_{RB}^{UL} - 1$
⋯⋯⋯⋯⋯
$n_{PRB} = 0$

| PUCCH format 1/1a/1b |
|---|
| $m = \begin{cases} N_{RB}^{(2)} \\ \left\lfloor \dfrac{n_{PUCCH}^{(1)} - c \cdot N_{cs}^{(1)}/\Delta_{shift}^{PUCCH}}{c \cdot N_{cs}^{RB}/\Delta_{shift}^{PUCCH}} \right\rfloor + N_{RB}^{(2)} + \left\lceil \dfrac{N_{cs}^{(2)}}{8} \right\rceil & \begin{array}{l} \text{if } n_{PUCCH}^{(1)} < c \cdot N_{cs}^{(1)}/\Delta_{shift}^{PUCCH} \\ \text{otherwise} \end{array} \end{cases}$ $c = \begin{cases} 3 & \text{normal CP} \\ 2 & \text{extended CP} \end{cases}$ |

| PUCCH format 2/2a/2b |
|---|
| $m = \left\lfloor n_{PUCCH}^{(2)} / N_{sc}^{RB} \right\rfloor$ | one subframe →

(diagram showing m=1, m=3, m=0, m=2 on top; m=2, m=0, m=3, m=1 on bottom)

FIG. 15
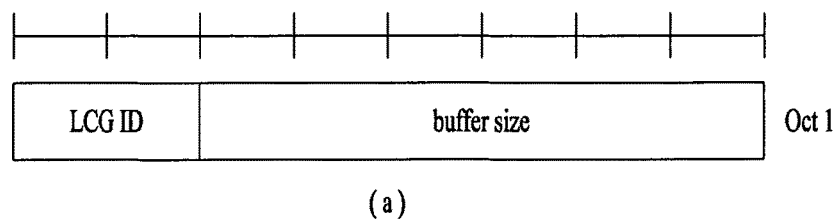
(a)
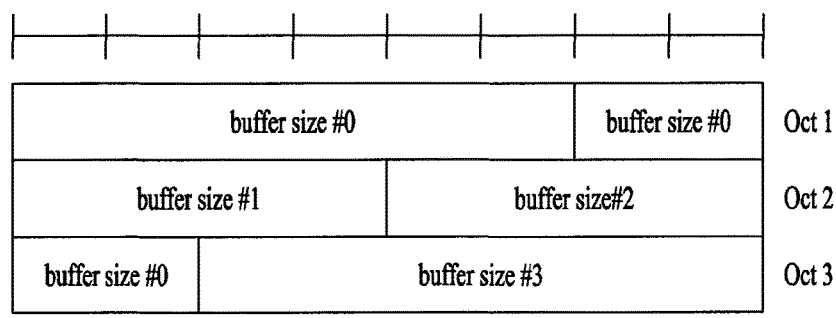
(b)
FIG. 16
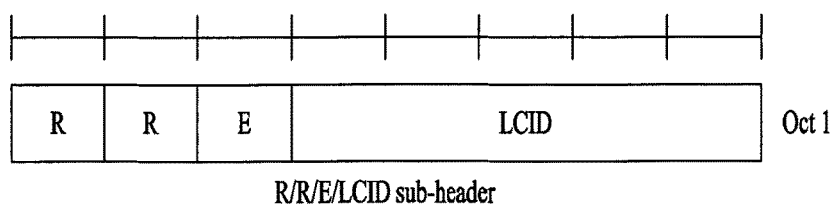
R/R/E/LCID sub-header

FIG. 17
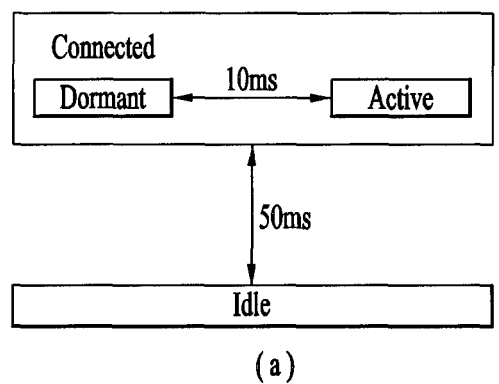
(a)
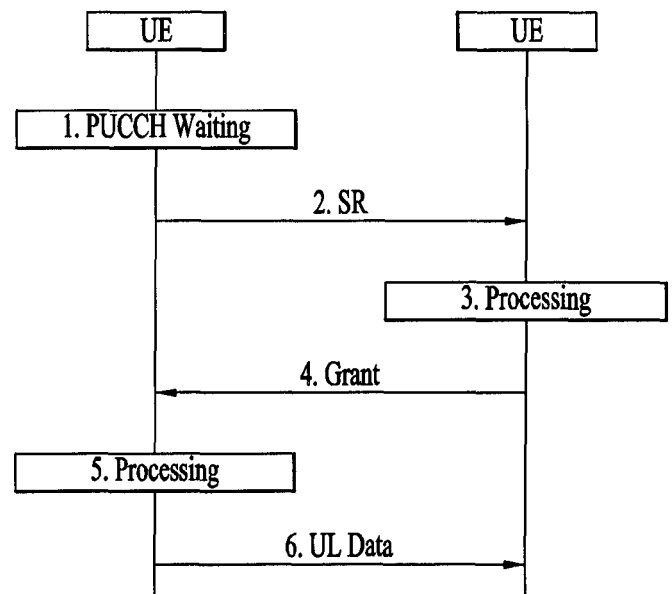
(b)

FIG. 18
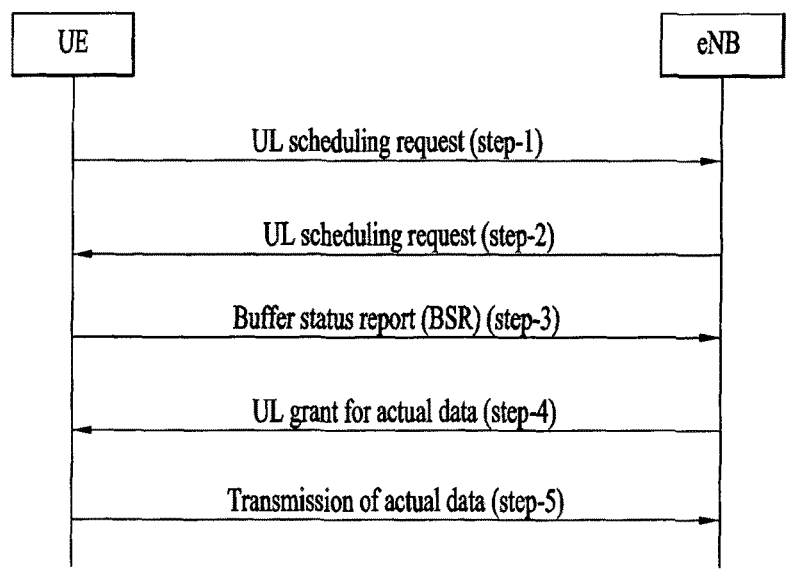
(a)
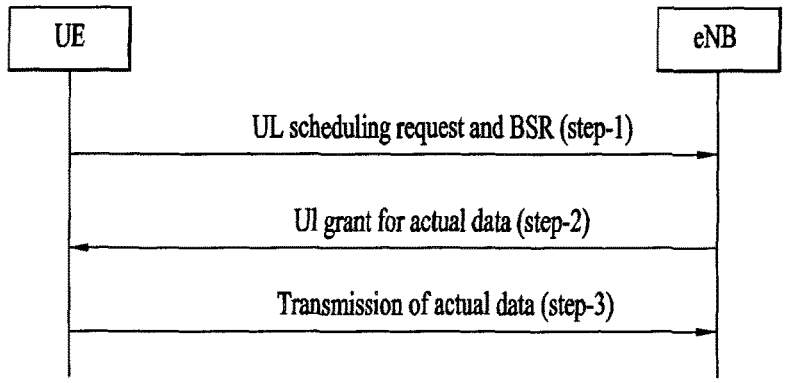
(b)

FIG. 21
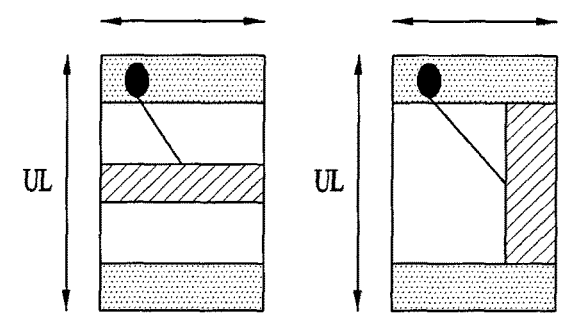
(a)
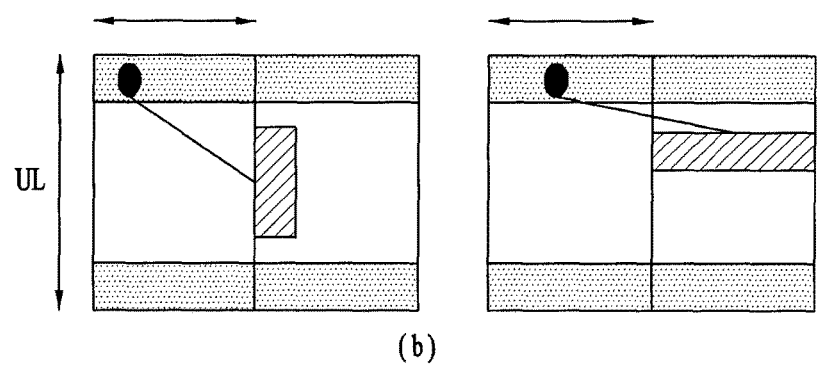
(b)
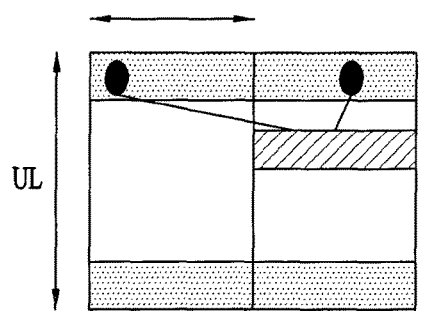
(c)

FIG. 22
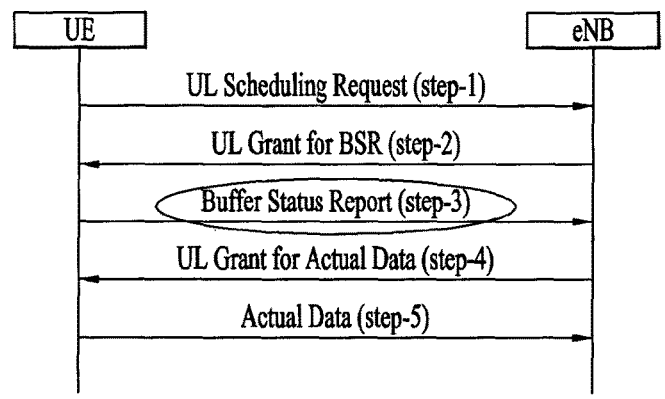
(a)
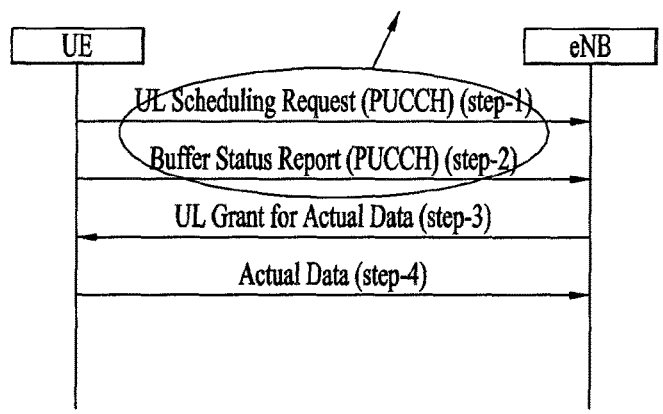
(b)

FIG. 23
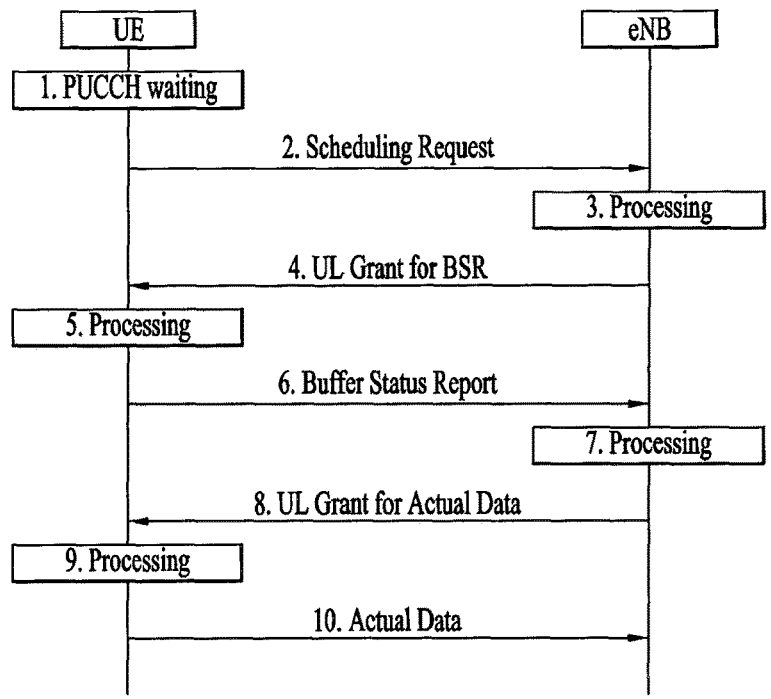
(a)
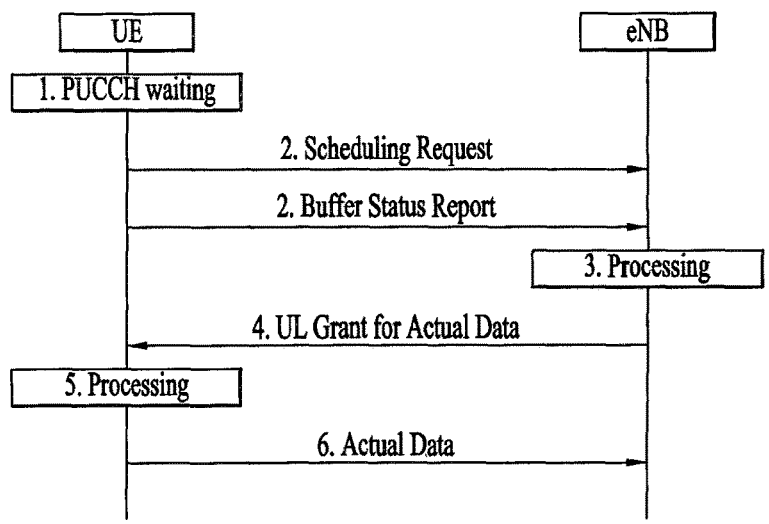
(b)

FIG. 24
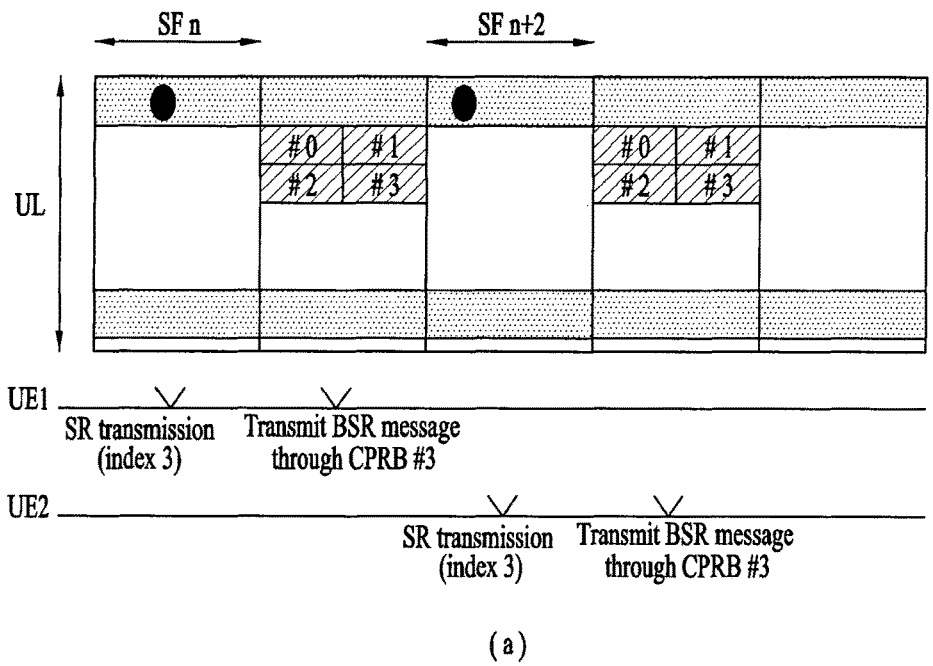
(a)
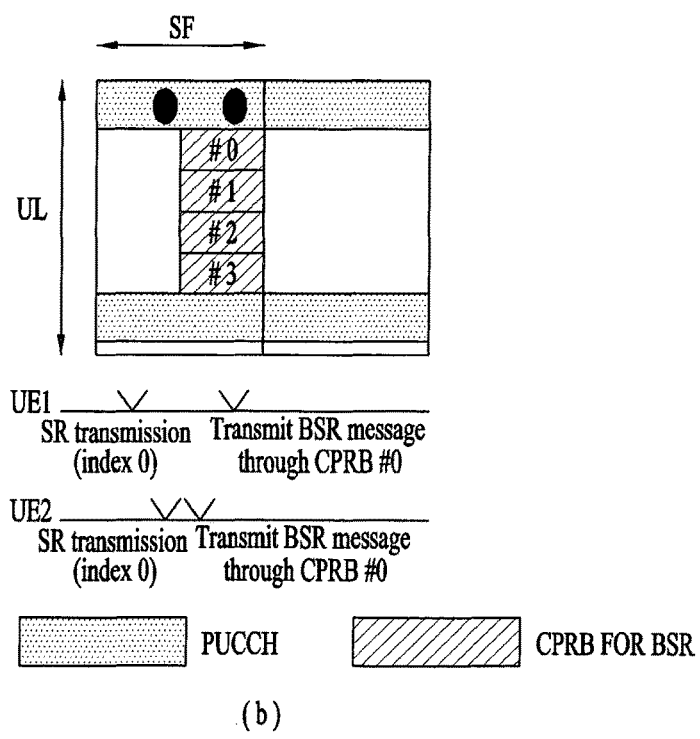
(b)

METHOD AND APPARATUS FOR TRANSMITTING SCHEDULING REQUEST USING CONTENTION-BASED RESOURCES IN WIRELESS COMMUNICATION SYSTEM

CROSS-REFERENCE TO RELATED APPLICATIONS

This application is the National Stage filing under 35 U.S.C. 371 of International Application No. PCT/KR2015/001571, filed on Feb. 16, 2015, which claims the benefit of U.S. Provisional Application Nos. 61/940,475, filed on Feb. 16, 2014, and 62/004,213, filed on May 29, 2014, the contents of which are all hereby incorporated by reference herein in their entirety.

TECHNICAL FIELD

The present invention relates to a wireless communication system, and more particularly to a method and apparatus for transmitting a scheduling request (SR) using contention-based resources.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention is to provide a method and apparatus for allowing a user equipment (UE) to transmit a scheduling request (SR) using contention-based resources.

An object of the present invention is to provide methods for transmitting uplink (UL) data after completion of the SR request.

An object of the present invention is to provide methods for transmitting a scheduling request (SR) to a network without collision with other UEs.

An object of the present invention is to provide a method for receiving an uplink grant when collision with other UEs occurs in a scheduling request (SR) transmission procedure.

An object of the present invention is to provide apparatuses for supporting the above-mentioned methods.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a scheduling request (SR) by a user equipment (UE) in a wireless communication system including: receiving information on a resource for the scheduling request (SR) from a base station (BS); transmitting the scheduling request (SR) using the scheduling request (SR) resource transmitted over a control channel; and transmitting a first buffer status report (BSR) using uplink (UL) contention-based resources transmitted over a data channel, wherein the UL contention-based resources are determined based on at least one of the resource for the scheduling request (SR) or an identifier (ID) of the UE.

The following description may be commonly applied to the embodiments of the present invention.

The first buffer status report (BSR) may be transmitted without receiving a grant for the buffer status report (BSR) using the UL contention-based resources.

The UL contention-based resources may be transmitted based on an index of the scheduling request (SR) resource.

Index of the UL contention-based resources is determined by the following equation, $$\text{Index of UL contention-based resource} = (\text{Index for scheduling request resource}) \bmod N \quad \text{[Equation]}$$

where mod is a modulo operation, and X is a number of contention-based resources contained in one contention-based uplink (UL) zone.

The index of the resource of the scheduling request (SR) may be a physical index of uplink resources through which the scheduling request (SR) is transmitted.

The method may further include: receiving a predetermined logic index from the base station (BS), wherein the index of the SR resource is the logical index mapped to the physical index.

The index of the UL contention-based resources may be determined by the following equation, $$\text{Index of UL contention-based resource} = (\text{UE ID}) \bmod N \quad \text{[Equation]}$$

where mod is a modulo operation, and X is a number of contention-based resources contained in one contention-based uplink (UL) zone.

The method may further include: receiving an uplink grant from the base station (BS); receiving an indication message indicating that the UL grant is used for buffer status report (BSR) from the base station (BS); and transmitting a second buffer status report (BSR).

The indication message indicating that the UL grant may be used for buffer status report (BSR) is transmitted from the base station (BS) when resources for other UEs are also transmitted to the uplink resources.

In accordance with another aspect of the present invention, a method for receiving a scheduling request (SR) by a base station (BS) in a wireless communication system includes: transmitting information on a resource for the scheduling request (SR) to a first user equipment (UE); receiving the scheduling request (SR) transmitted over a control channel from the first UE; and receiving a buffer status report (BSR) using resources transmitted over a data channel, wherein the buffer status report (BSR) is transmitted using first uplink (UL) contention-based resource, and the first uplink contention-based resource is determined based on at least one of the resource for the scheduling request (SR) or an identifier (ID) of the user equipment (UE).

The method may further include: receiving a buffer status report (BSR) from a second UE using second UL contention-based resources; and if the first UL contention-based resource and the second UL contention-based resource are identical to each other, transmitting an uplink (UL) grant to the first UE, wherein a grant for the buffer status report (BSR) indicates that the grant is used for buffer status report (BSR).

The method may further include: receiving a buffer status report (BSR) from a second UE using second UL contention-based resources; if the first UL contention-based resource and the second UL contention-based resource are different from each other, transmitting an uplink (UL) grant to the first UE; and receiving data from the first UE.

In accordance with another aspect of the present invention, a user equipment (UE) device for transmitting a scheduling request (SR) includes: a receiver configured to receive information on a resource for the scheduling request (SR) from a base station (BS), a transmitter configured to transmit the scheduling request (SR) using the scheduling request (SR) resource transmitted over a control channel, and to transmit a first buffer status report (BSR) using uplink (UL) contention-based resources transmitted over a data channel; and a processor configured to control the receiver and the transmitter, wherein the UL contention-based resources are determined based on at least one of the resource for the scheduling request (SR) or an identifier (ID) of the UE.

In accordance with another aspect of the present invention, a base station (BS) device for receiving a scheduling request (SR) includes: a transmitter configured to transmit information on a resource for the scheduling request (SR) to a first user equipment (UE); a receiver configured to receive the scheduling request (SR) transmitted over a control channel from the first UE, and to receive a buffer status report (BSR) using resources transmitted over a data channel; and a processor configured to control the receiver and the transmitter, wherein the buffer status report (BSR) is transmitted using first uplink (UL) contention-based resource, and the first uplink contention-based resource is determined based on at least one of the resource for the scheduling request (SR) or an identifier (ID) of the user equipment (UE).

It is to be understood that both the foregoing general description and the following detailed description of the present invention are exemplary and explanatory and are intended to provide further explanation of the invention as claimed.

Advantageous Effects

The embodiments of the present invention have the following effects.

First, the embodiments can efficiently transmit the SR and subsequent data.

Second, a user equipment (UE) can transmit the SR to the network without colliding with other UEs.

Third, if a user equipment (UE) collides with other UEs, the embodiments of the present invention can receive an uplink (UL) grant and can also transmit UL data.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings. That is, unintended effects of the present invention may be also derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. In the drawings:

FIG. 2 is a diagram for structures of control and user planes of radio interface protocol between a 3GPP radio access network standard-based user equipment and E-UTRAN.

FIG. 11 illustrates ACK/NACK channelization for PUCCH formats 1 a and 1b.

FIG. 13 illustrates allocation of a physical resource block (PRB).

FIG. 15 is a conceptual diagram illustrating a buffer status report (BSR) defined in an LTE system.

FIG. 16 is a conceptual diagram illustrating an MAC subheader defined in the LTE system.

FIG. 17 is a conceptual diagram illustrating a method for switching from a dormant status to an active status.

FIG. 18 is a flowchart illustrating a scheduling request (SR) procedure according to an embodiment of the present invention.

FIG. 21 is a conceptual diagram illustrating a CP zone for reporting a buffer status according to an embodiment of the present invention.

FIG. 22 is a flowchart illustrating the result of comparison between scheduling request (SR) procedures according to whether or not the CP zone is configured.

FIG. 23 is a flowchart illustrating the effects achieved when the CP zone is configured for buffer status reporting.

FIG. 24 is a conceptual diagram illustrating a method for occupying the contention-based resource block based on uplink physical resources according to an embodiment of the present invention.

BEST MODE

Figure 1:
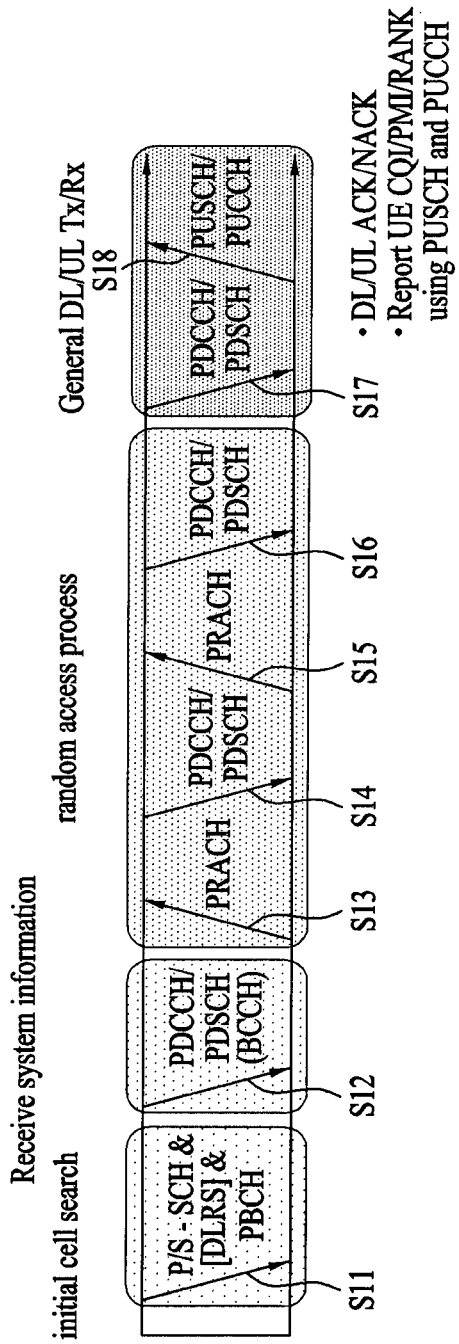
FIG. 1 illustrates physical channels used in 3GPP LTE(-A) and a signal transmission method using the same.

The following embodiments will disclose methods for transmitting a CSI in a wireless access system supporting multiple connection modes in which a user equipment (UE) is connected to two or more small cells, and apparatuses for supporting the methods.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is made, centering on a data transmission and reception relationship between a Base Station (BS) and a User Equipment (UE). A BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', Advanced BS (ABS)', 'Access Point (AP)', etc.

In addition, the term 'terminal' may be replaced with the term 'UE', 'Mobile Station (MS)', 'Subscriber Station (SS)', 'Mobile Subscriber Station (MSS)', 'Mobile Terminal', 'Advanced MS (AMS)', etc.

A transmission end refers to a fixed and/or mobile node that provides data service or voice service and a reception end refers to a fixed and/or mobile node that receives data service or voice service. Accordingly, a UE may serve as a transmission end and a BS may serve as a reception end, on the uplink, whereas the UE may serve as a reception end and the BS may serve as a transmission end, on the downlink.

The embodiments of the present invention can be supported by standard documents disclosed for at least one of wireless access systems, that is, an Institute of Electrical and Electronics Engineers (IEEE) 802.xx system, a 3rd Generation Partnership Project (3GPP) system, a 3GPP Long Term Evolution (LTE) system, and a 3GPP2 system. Especially, the embodiments of the present invention can be supported by 3GPP TS 36.211, 3GPP TS 36.212, 3GPP TS 36.213, and 3GPP TS 36.321. That is, steps or parts that are not described in order to clarify the subject matter of the present invention can be supported by the above documents. Further, all terms described in this specification can be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are used to help the understanding of the present invention and they can be replaced with other terms within the spirit and scope of the present invention.

In the following, 3GPP LTE/LTE-A system is described as an example of a wireless communication system, which the embodiments of the present invention are applicable to.

The following embodiments of the present invention can be applied to a variety of wireless access technologies, for example, CDMA, FDMA, TDMA, OFDMA, SC-FDMA, MC-FDMA, and the like.

CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like.

UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. 3GPP LTE adopts OFDMA for downlink and adopts SC-FDMA for uplink. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

1. 3GPP LTE/LTE_A System

In a wireless communication system, a user equipment may receive information from a base station via downlink (DL), and the user equipment may also transmit information via uplink (UL). The information received and/or transmitted (or transceived) by the user equipment includes data and diverse control information. And, various physical channels may exist depending upon the type and purpose of the information received and/or transmitted (or transceived) by the user equipment.

1.1 General System

FIG. 1 illustrates physical channels that are used in a 3GPP LTE and a general signal transmitting method using the same.

When a power of a user equipment is turned off and then turned back on, or when a user equipment newly enters (or accesses) a cell, the user equipment performs an initial cell search process, such as synchronizing itself with the base station in step S11. For this, the user equipment may receive a Primary Synchronization Channel (P-SCH) and a Secondary Synchronization Channel (S-SCH) from the base station so as to be in synchronization with the base station, and the user equipment may also acquire information, such as cell ID. Thereafter, the user equipment may receive a Physical Broadcast Channel (PBCH) so as to acquire broadcast information within the cell. Meanwhile, the user equipment may receive Downlink Reference Signal (DL RS), in the step of initial cell search, so as to verify the downlink channel status.

The user equipment that has completed the initial cell search may receive a PDCCH (Physical Downlink Control Channel) and a PDSCH (Physical Downlink Shared Channel) based upon the PDCCH (Physical Downlink Control Channel) information, in step S12, so as to acquire more detailed system information.

Thereafter, in order to complete the access to the base station, the user equipment may perform a Random Access Procedure, such as in steps S13 and S16 of a later process, so as to complete the access to the base station. In order to do so, the user equipment transmits a preamble through a PRACH (Physical Random Access Channel) (S13), and then the user equipment may receive a response message respective to the random access through the PDCCH and its respective PDSCH (S14). In case of a contention based random access, the user equipment may perform Contention Resolution Procedures, such as transmitting an additional Physical Random Access Channel (PRACH) (S15) and receiving a Physical Downlink Control Channel (PDCCH) and a Physical Downlink Shared Channel (PDSCH) corresponding to the PDCCH.

After performing the above-described procedures, the user equipment may receive a Physical Downlink Control Channel (PDCCH)/Physical Downlink Shared Channel (PDSCH) (S17), as a general uplink/downlink signal transmission procedure, and may then perform PUSCH (Physical Uplink Shared Channel)/PUCCH (Physical Uplink Control Channel) transmission (S18).

The control information being transmitted by the user equipment to the base station is collectively referred to as Uplink Control Information (UCI). The UCI may include HARQ ACK/NACK (Hybrid Automatic Repeat and reQuest Acknowledgement/Negative-ACK), SR (Scheduling Request), CQI (Channel Quality Indicator), PMI (Precoding Matrix Indicator), RI (Rank Indication), and so on.

The UCI is generally periodically transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
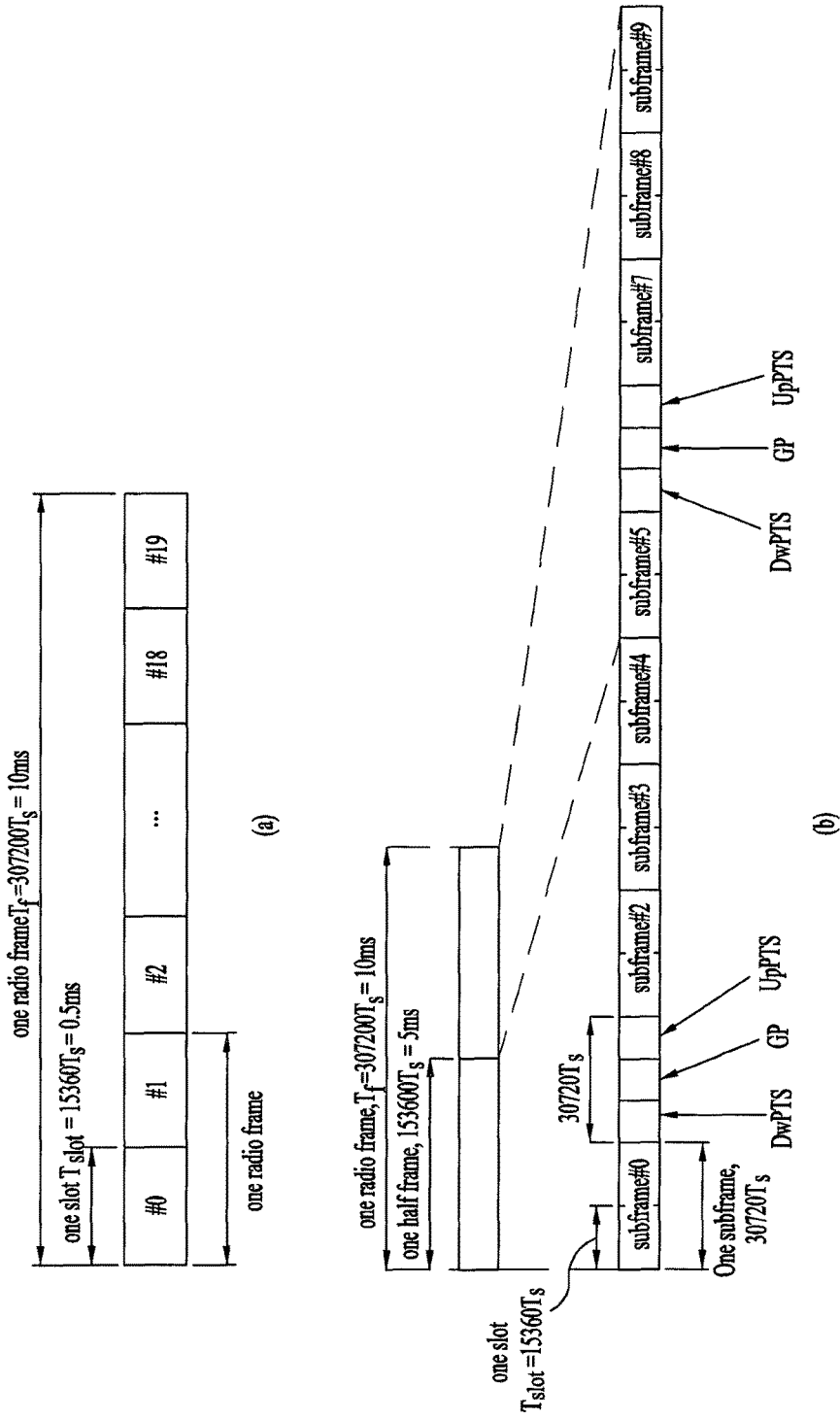
FIG. 3 illustrates a radio frame structure.

FIG. 3 illustrates an exemplary structure of a radio frame that can be used in embodiments of the present invention.

FIG. 3(a) illustrates a type-1 radio frame structure. A downlink subframe includes 10 subframes each of which includes 2 slots in the time domain. A time for transmitting a subframe is defined as a transmission time interval (TTI). For example, each subframe has duration of 1 ms and each slot has duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 3(b) illustrates a type-2 radio frame structure. The type-2 radio frame includes 2 half frames. Each half frame includes 5 normal subframes DwPTS (Downlink Pilot Time Slot), GP (Guard Period), and UpPTS (Uplink Pilot TimeSlot). A subframe is composed of 2 slots. DwPTS is used for initial cell search, synchronization or channel estimation in a UE and UpPTS is used for channel estimation in a BS and uplink transmission synchronization in a UE. The GP eliminates UL interference caused by multipath delay of a DL signal between a UL and a DL. Meanwhile, one subframe composed of 2 slots regardless of a type of radio frame.

Following Table 1 shows special subframe configuration (DwPTS/GP/UpPTS length).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 4:
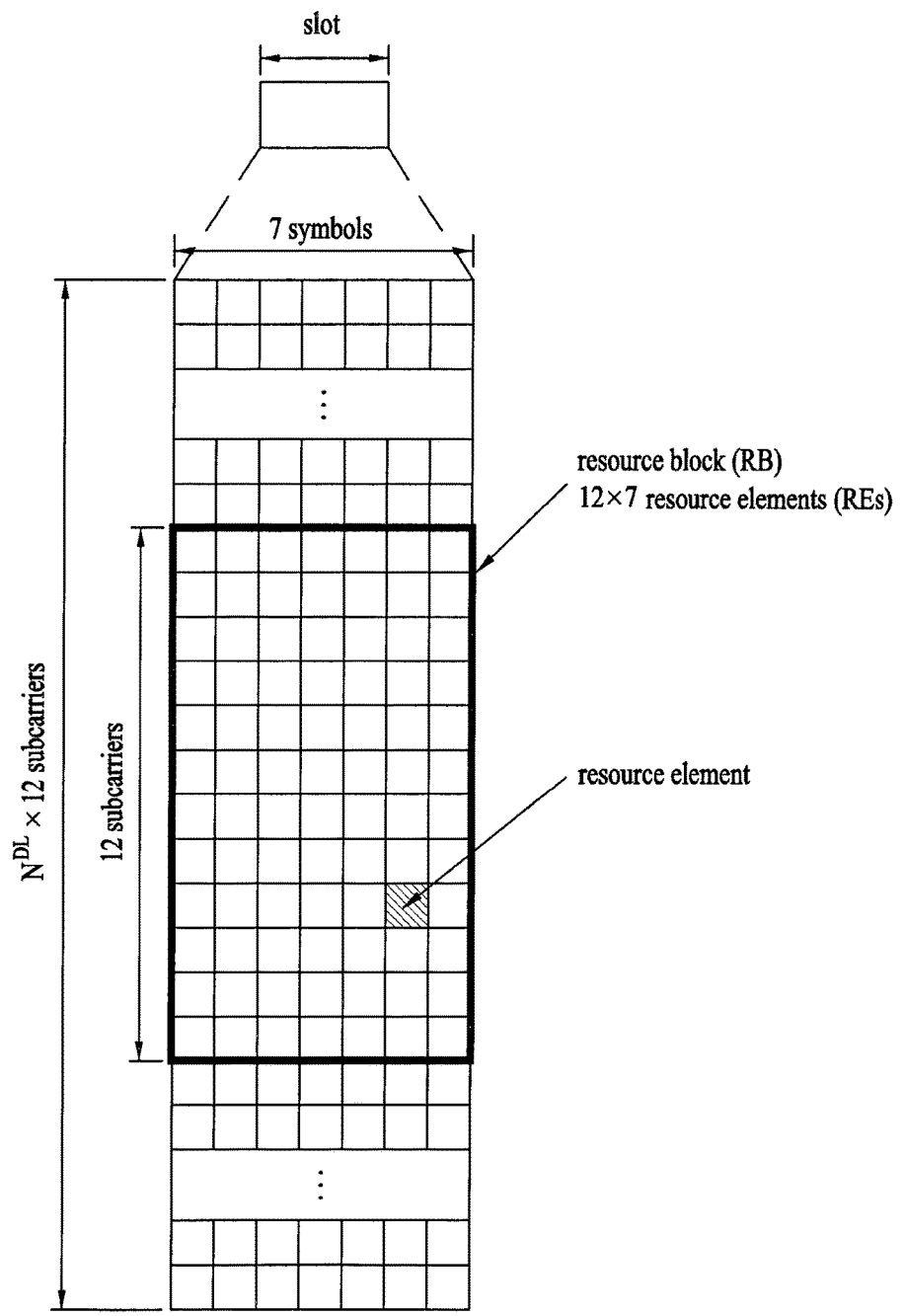
FIG. 4 illustrates a resource grid of a downlink slot.

FIG. 4 illustrates the structure of a resource grid for the duration of one Downlink (DL) slot, which can be used in embodiments of the present invention.

Referring to FIG. 4, a DL slot includes a plurality of OFDM symbols in the time domain. In FIG. 4, a DL slot includes 7 OFDM symbols and an RB includes 12 subcarriers in the frequency domain, by way of example.

Each element of the resource grid is referred to as a Resource Element (RE). An RB includes 12×7 REs. The number of RBs in a DL slot, $N^{DL}$ depends on a DL transmission bandwidth set by a cell. A structure of UL slot may be identical to a structure of DL slot.

Figure 5:
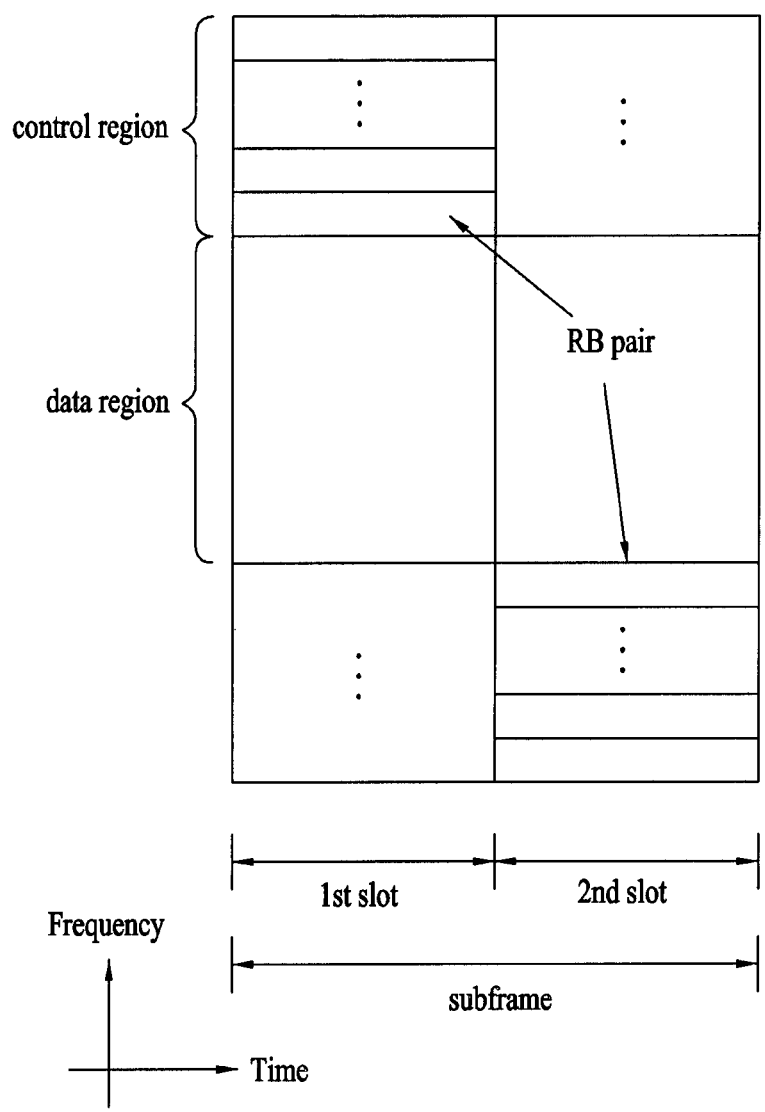
FIG. 5 illustrates an uplink subframe structure.

FIG. 5 illustrates the structure of a UL subframe whish can be used in embodiments of the present invention.

Referring to FIG. 5, The UL subframe is divided into a data region and a control region in the frequency domain. The control region includes a Physical Uplink Control CHannel (PUCCH) and is used to transmit Uplink Control Information (UCI The data region includes a Physical Uplink Shared CHannel (PUSCH) and is used to transmit a data signal. To maintain a single carrier property in the LTE system, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Figure 6:
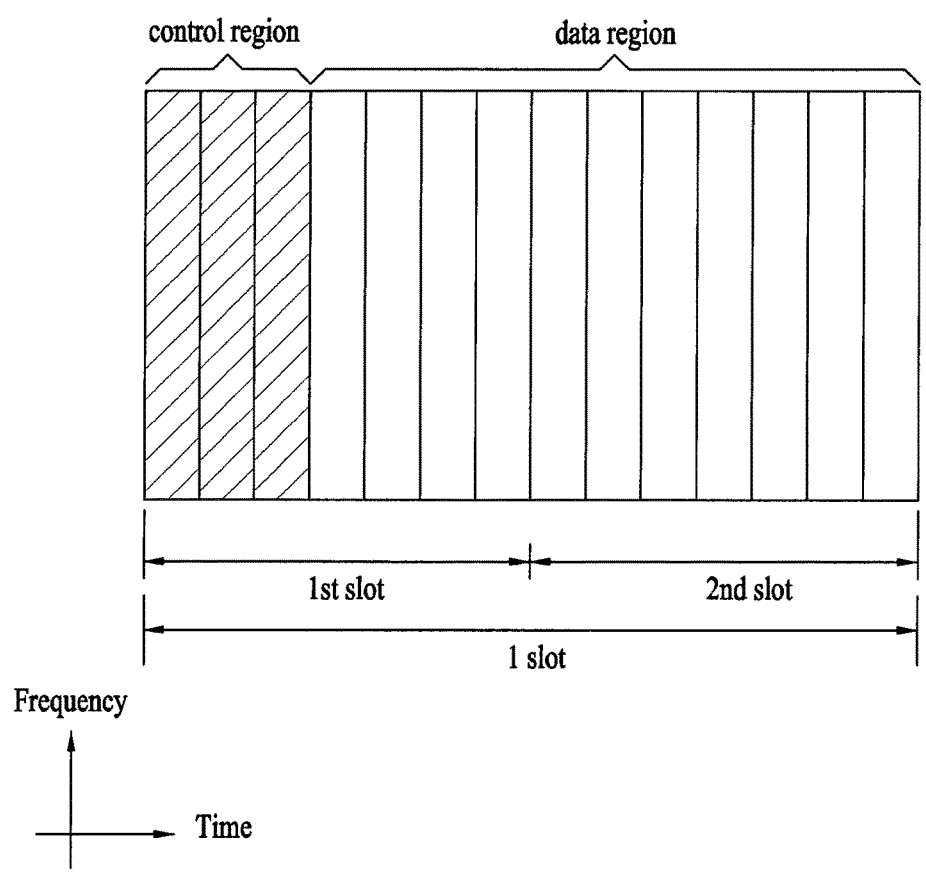
FIG. 6 illustrates a downlink subframe structure.

FIG. 6 illustrates the structure of a DL subframe that can be used in embodiments of the present invention.

Referring to FIG. 6, a subframe includes two slots in the time domain. Up to three OFDM symbols at the start of the first slot in a DL subframe are used for a control region to which control channels are allocated and the other OFDM symbols of the DL subframe are used for a data region to which a Physical Downlink Shared CHannel (PDSCH) is allocated. DL control channels used in the 3GPP LTE system include a Physical Control Format Indicator CHannel (PCFICH), a Physical Downlink Control CHannel (PDCCH), and a Physical Hybrid-ARQ Indicator Channel (PHICH).

The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. That is, an ACK/NACK signal for Uplink (UL) data transmitted from a UE is delivered on the PHICH. Control information carried on the PDCCH is called Downlink Control Information (DCI). The DCI includes resource allocation information and other control information for a UE or a UE group. For example, the DCI may transport UL resource allocation information, DL resource allocation information, and UL Transmit Power Control (TPC) commands.

1.2 PUCCH (Physical Uplink Control Channel)

The PUCCH includes the following formats in order to transmit control information.

(1) Format 1: Used for on-off keying (OOK) modulation and scheduling request (SR)

(2) Format 1a and Format 1b: Used for ACK/NACK transmission

1) Format 1a: BPSK ACK/NACK for one codeword

2) Format 1b: QPSK ACK/NACK for two codewords (3) Format 2: Used for QPSK modulation and CQI transmission (4) Format 2a and Format 2b: Used for CQI and ACK/NACK simultaneous transmission.

(5) Format 3: Used for a plurality number of ACK/NACK transmission in CA (Carrier Aggregation) environment.

Table 2 shows a modulation scheme and the number of bits per subframe according to PUCCH format. Table 3 shows the number of RSs per slot according to PUCCH format. Table 4 shows SC-FDMA symbol locations of an RS according to PUCCH format. In Table 2 the PUCCH formats 2a and 2b correspond to the case of normal CP.

TABLE 2

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 3

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 4

| | SC-FDMA symbol location of RS | |
|---|---|---|
| PUCCH format | Normal CP | Extended CP |
| 1, 1a, 1b | 2, 3, 4 | 2, 3 |
| 2, 3 | 1, 5 | 3 |
| 2a, 2b | 1, 5 | N/A |

Figure 7:
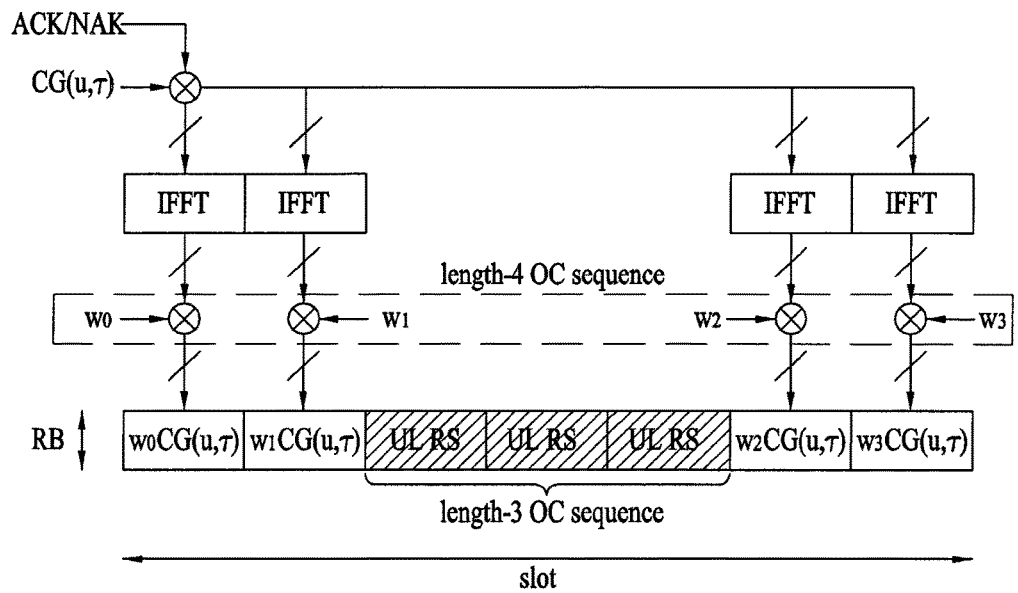
FIG. 7 illustrates PUCCH formats 1a and 1b for use in a normal cyclic prefix (CP) case.
Figure 8:
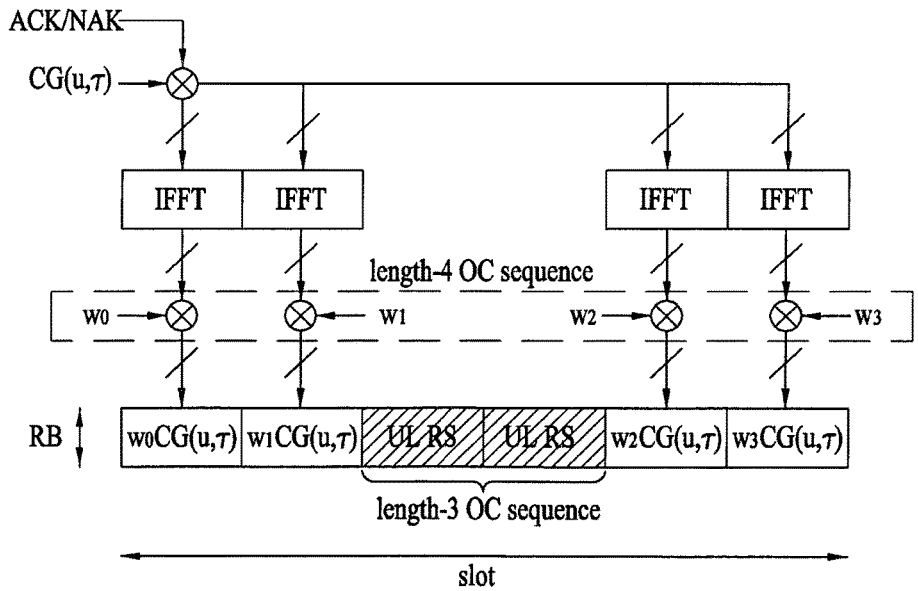
FIG. 8 illustrates PUCCH formats 1a and 1b for use in an extended CP case.

FIG. 7 shows a PUCCH format 1a and 1b structure in the case of a normal CP. FIG. 8 shows a PUCCH format 1a and 1b structure in the case of an extended CP.

In the PUCCH format 1a and 1b structure, the same control information is repeated in each slot within a subframe. UEs transmit ACK/NACK signals through different resources that include orthogonal covers or orthogonal cover codes (OCs or OCCs) and different cyclic shifts (i.e., different frequency domain codes) of a Computer-Generated Constant Amplitude Zero Auto Correlation (CG-CAZAC) sequence. For example, the OCs may include orthogonal Walsh/DFT codes. When the number of CSs is 6 and the number of OCs is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation).

For SR and persistent scheduling, ACK/NACK resources composed of CSs, OCs and PRBs may be assigned to UEs through Radio Resource Control (RRC). For dynamic ACK/NACK and non-persistent scheduling, ACK/NACK resources may be implicitly assigned to the UE using the lowest CCE index of a PDCCH corresponding to the PDSCH.

Table 5 shows length 4-orthogonal (OC) sequence for PUCCH format 1/1a/1b. Table 6 ≟ length 3-orthogonal (OC) sequence for PUCCH format 1/1a/1b.

TABLE 5

| Sequence index $n_{oc}$ $(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 6

| Sequence index $n_{oc}$ $(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 7 shows Orthogonal Sequence (OC) $[\overline{w}(0) \ldots \overline{w}(N_{RS}^{PUCCH}-1)]$ for RS in PUCCH format 1a/1b.

TABLE 7

| Sequence index $\overline{n}_{oc}$ $(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 9:
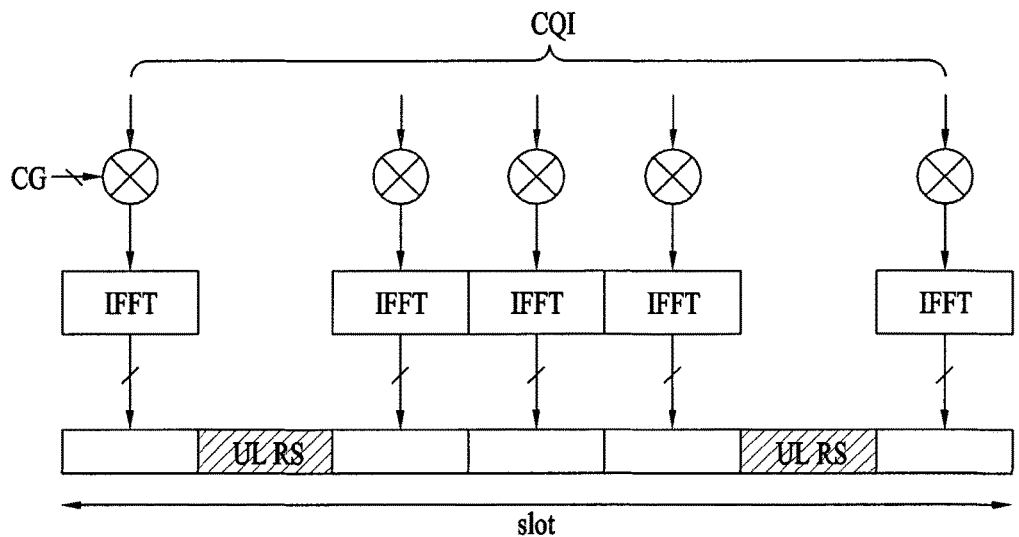
FIG. 9 illustrates PUCCH formats 2/2a/2b in a normal cyclic prefix (CP) case.
Figure 10:
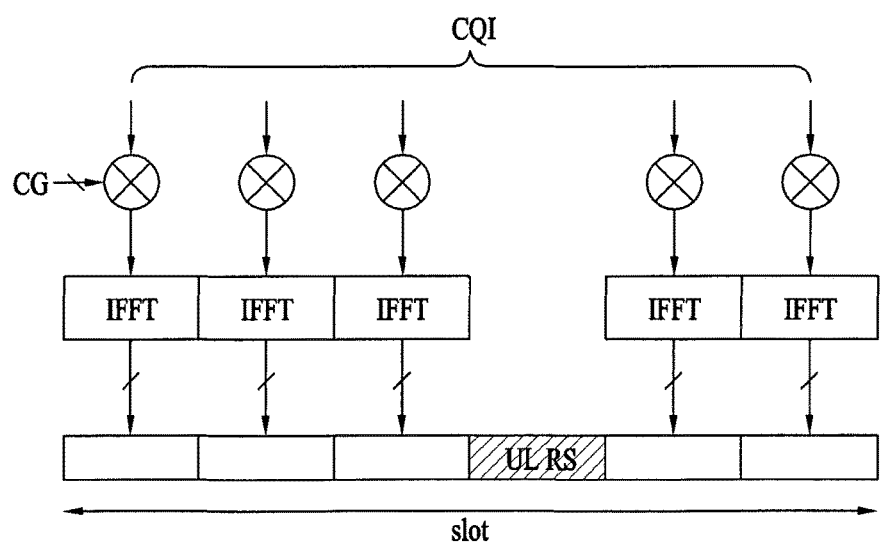
FIG. 10 illustrates PUCCH formats 2/2a/2b in an extended CP case.
Figure 12:
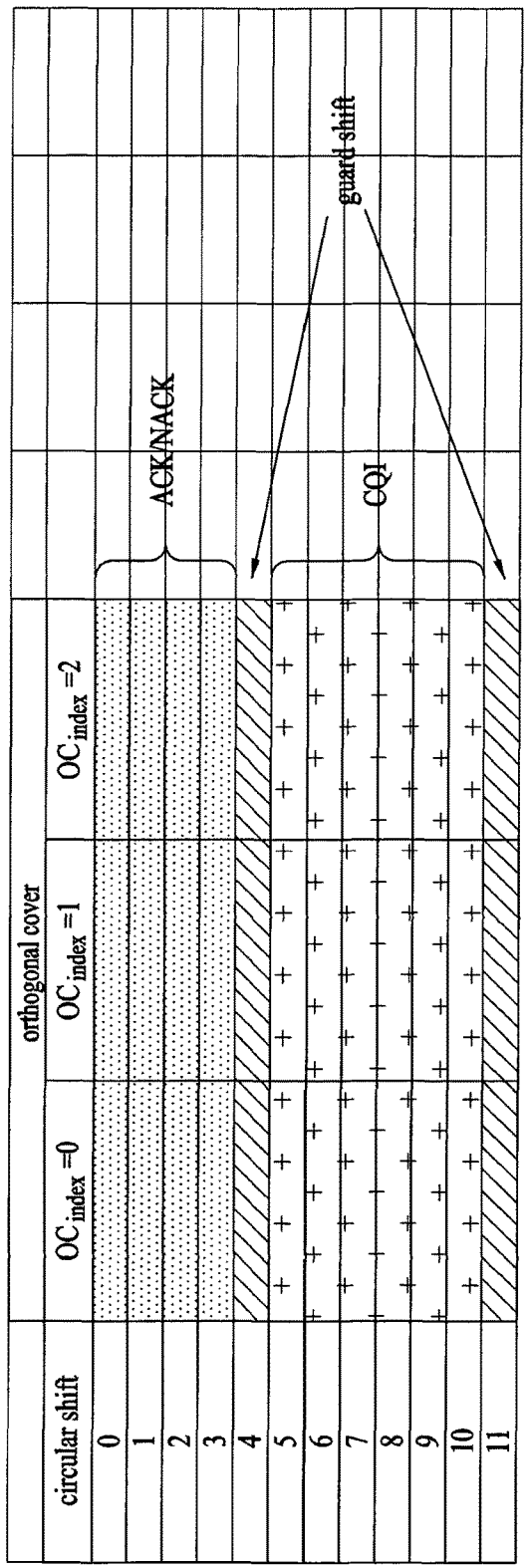
FIG. 12 illustrates channelization for a hybrid structure of PUCCH formats 1a/1b and formats 2/2a/2b in the same PRB.

FIG. 9 shows a PUCCH format 2/2a/2b structure in the case of the normal CP. FIG. 10 shows a PUCCH format 2/2a/2b structure in the case of the extended CP. As shown in FIGS. 9 and 10, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in PUCCH formats 1/1a/1b and 2/2a/2b, a plurality of UEs may be multiplexed by CS+OC+PRB and CS+PRB.

FIG. 11 illustrates ACK/NACK channelization for PUCCH formats 1a and 1b when $\Delta_{shift}^{PUCCH}=2$.

FIG. 18 illustrates channelization of a structure in which PUCCH formats 1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization (2) Slot level CS/OC remapping
1) For inter-cell interference randomization
2) Slot-based access for mapping between ACK/NACK channels and resources (k)

A resource $n_r$ for PUCCH formats 1a/1b includes the following combination.

(1) CS (=DFT OC in a symbol level) $(n_{cs})$
(2) OC (OC in a slot level) $(n_{oc})$
(3) Frequency RB $(n_{rb})$ When indices representing the CS, the OC and the RB are $n_{cs}$, $n_{oc}$ and $n_{rb}$, respectively, a representative index $n_r$ includes $n_{cs}$, $n_{oc}$ and $n_{rb}$. That is, $n_r=(n_{cs}, n_{oc}, n_{rb})$.

A CQI, a PMI, an RI, and a combination of a CQI and an ACK/NACK may be transmitted through PUCCH formats 2/2a/2b. Here, Reed Muller (RM) channel coding may be applied.

For example, in the LTE system, channel coding for a UL CQI is described as follows. A bit stream $a_0$, $a_1$, $a_2$, $a_3$, ..., $a_{A-1}$ is channel-coded using a (20, A) RM code. $a_0$ and $a_{A-1}$ represent a Most Significant Bit (MSB) and a Least Significant Bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied to the encoded bits. Before QPSK modulation, the encoded bits may be scrambled.

Table 8 shows a base sequence for the (20, A) code.

TABLE 8

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0$, $b_1$, $b_2$, $b_3$, ..., $b_{B-1}$ may be generated by Equation 1.

$$b_i = \sum_{n=0}^{A-1} (a_n \cdot M_{i,n}) \bmod 2 \qquad \text{[Equation 1]}$$

where i=0, 1, 2, ..., B-1.

A bandwidth of a UCI field for wideband CQI and PMI reports is shown as table 9 to table 11.

Table 9 shows an uplink control information (UCI) field for wideband reporting (single antenna port, transmit diversity or open loop spatial multiplexing PDSCH) CQI feedback.

TABLE 9

| field | bandwidth |
|---|---|
| wideband CQI | 4 |

Table 10 shows a UCI field for CQI and PMI feedback for wideband reporting (closed loop spatial multiplexing PDSCH).

TABLE 10

| | bandwidth | | | |
|---|---|---|---|---|
| | 2 antenna port | | 4 antenna port | |
| Field | rank = 1 | rank = 2 | rank = 1 | Rank >1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 11 shows a UCI field for RI feedback for wideband reporting.

TABLE 11

| | bandwidth | |
|---|---|---|
| | | 4 antenna port |
| field | 2 antenna port | Up to two layers | Up to four layers |
| Rank indicator | 1 | 1 | 2 |

FIG. 13 shows PRB allocation. As shown in FIG. 13, the PRB may be used for PUCCH transmission in slot $n_s$.

2. SR Transmission in LTE/LTE-A System

When UL data to be transmitted from the UE is present, a scheduling request (SR) is used when the UE transmits a scheduling request (SR) to the base station (BS). In order to transmit the SR of the UE, PUCCH resources are allocated, and the SR transmission is performed according to the on-off keying scheme. For example, the UE uses PUCCH resources only when the SR is transmitted. When the SR is not transmitted, the UE does not use the PUCCH resources.

The base station (BS) having received the SR from the UE transmits a UL grant including scheduling information to the UE over a PDCCH, so that the BS transmits a PUSCH. SR transmission is configured in such a manner that the SR is transmitted at a specific subframe through a predetermined time and a subframe offset. Therefore, if the UE does not receive the UL grant regarding the SR from the eNB at the SR subframe of the next period, the UE may retransmit the SR to the eNB.

The UE may receive a configuration index parameter ($I_{SR}$) indicating the SR configuration index through higher layer signaling so as to implement SR transmission. By the configuration index parameter, the SR transmission period parameter ($SR_{PERIODICITY}$) indicating the SR transmission period and the SR subframe offset (NOFFSET,SR) indicating a subframe for SR transmission may be configured. That is, SR may be transmitted at a specific subframe that is periodically repeated by ISR given by higher layer signaling. Table 12 may indicate not only the SR transmission period parameter ($SR_{PERIODICITY}$) based on the SR configuration index, but also the SR subframe offset.

TABLE 12

| SR configuration Index $I_{SR}$ | SR periodicity (ms) $SR_{PERIODICITY}$ | SR subframe offset $N_{OFFSET,SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

Figure 14:
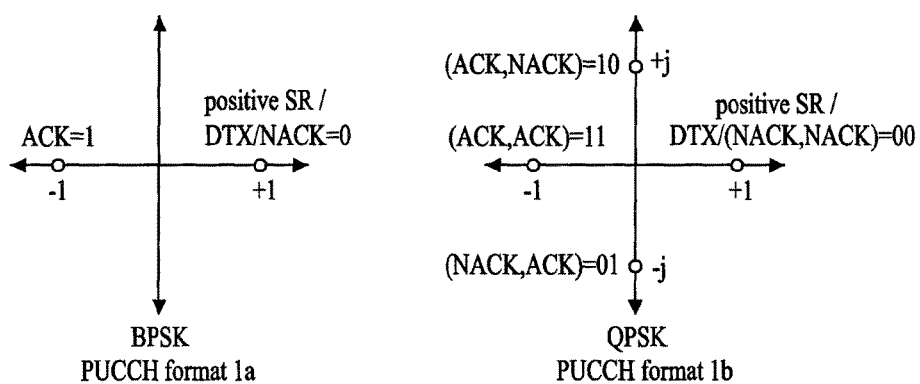
FIG. 14 is a conceptual diagram illustrating a method for multiplexing ACK/NACK and SR.

FIG. 14 illustrates an exemplary method of multiplexing an ACK/NACK with an SR.

The structure of the SR PUCCH format 1 is identical to the ACK/NACK PUCCH format 1a/1b shown in FIG. 6. The SR uses On-Off keying. More specifically, in order to request a PUSCH resource (positive SR), the user equipment transmits an SR having a modulation symbol d(0)=1. And, when scheduling is not requested (negative SR), the user equipment does not perform any transmission (or does not transmit anything). Since the same PUCCH structure for the ACK/NACK is re-used for the SR, different PUCCH resource indexes existing in the same PUCCH region (e.g., a combination of different cyclic time shift/orthogonal code) may be allocated to the SR (format 1) or the HARQ ACK/NACK (formats 1a/1b). The PUCCH resource index $m_{PUCCH,SR1}^{(1)}$, which is to be used by the user equipment for SR transmission may be determined by UE-specific higher layer signaling.

When the user equipment is required to transmit a positive SR in a subframe being scheduled to perform CQI transmission, the CQI is dropped, and only the SR is transmitted. Similarly, when a simultaneous SR and SRS (Sounding RS) transmission situation occurs, the user equipment drops the CQI and transmits only the SR. In case the SR and the ACK/NACK are generated from the same subframe, the user equipment may transmit the ACK/NACK over the SR PUCCH resource, which is allocated for the positive SR. In case of the negative SR, the user equipment transmits the ACK/NACK over the allocated HARD-ACK PUCCH resource. FIG. 13 shows an exemplary mapping constellation for a simultaneous transmission of the ACK/NACK and the SR. More specifically, FIG. 13 shows an example of a case when the NACK (or NACK, NACK, in case of two MIMO codewords) is modulated and mapped to +1 (n RS modulation). Accordingly, when a DTX (Discontinuous Transmission) occurs, the signal is processed as a NACK.

As described above, ACK/NACK and SR may be simultaneously transmitted. For example, if the UE transmits ACK/NACK through PUCCH formats 1/1a/1b and a negative SR is given, the ACK/NACK is transmitted using PUCCH resources reserved for the ACK/NACK. If a positive SR is given, the UE may transmit the ACK/NACK using PUCCH resources allocated for SR.

If the UE transmits the ACK/NACK using PUCCH format 3, SR is joint-encoded with the ACK/NACK so that the SR is transmitted using PUCCH resources designated for PUCCH format 3.

3. Buffer Status Report (BSR)

Next, a buffer status report (BSR) performed by the MAC layer will be described in more detail. In the LTE system, for efficient use of radio resources of the uplink, the base station should know how many data and what kind of data should be transmitted to each user equipment through the uplink. Accordingly, the user equipment may directly transmit information on its desired uplink data to the base station, and the base station may allocate uplink resources to the corresponding user equipment on the basis of the information on the uplink data. In this case, the information on the uplink data transmitted from the user equipment to the base station is the quantity of uplink data stored in a buffer of the user equipment, and will be referred to as a buffer status report (BSR).

The user equipment transmits the BSR in the form of MAC control element (CE), and the BSR includes two types of short BSR and long BSR in the LTE system according to the related art. The buffer status report (BSR) will be described in more detail with reference to FIG. 15.

FIG. 15 is a diagram illustrating an example of a buffer status report (BSR) defined in an LTE system. In particular, FIG. 15(a) illustrates a data structure of a short BSR, and FIG. 15(b) illustrates a data structure of a long BSR.

Referring to FIG. 15, whether the user equipment selects and transmits which one of short BSR and long BSR will be determined on the basis of the number of logical channel groups (LCG) where uplink data exist. In other words, the user equipment transmits the short BSR if there are data to be transmitted to one LCG only, and the user equipment transmits the long BSR if there are data to be transmitted to two or more LCGs. In this case, the LCG means that several logical channels of which quality of service (QoS) is similar to one another are grouped. In the current LTE system, four LCGs having LCG IDs of 0 to 3 are used. The base station notifies the user equipment of a logical channel group (LCG) to which the logical channel of the radio bearer (RB) belongs, when the radio bearer (RB) is established.

Also, the user equipment transmits the short BSR together with logical channel group (LCG) ID to indicate a logical channel group (LCG) to which a buffer size field representing buffer size corresponds. However, the user equipment transmits the long BSR including buffer size field in the order of the logical channel group having LCG ID of 0 to the logical channel group having LCG ID of 3 without LCG ID.

FIG. 16 is a diagram illustrating a structure of a MAC subheader defined in an LTE system. In particular, FIG. 16 illustrates a structure of R/R/E/LCID type subheader.

Referring to FIG. 16, R is a reserved bit and is set to 0. Also, E is an extension field and includes a flag bit indicating whether an additional field exists in MAC header. In other words, if E is set to 1, it indicates that another R/R/E/LCID type subheader exists.

Finally, LCID is a logical channel ID field, and indicates whether a corresponding logical channel or MAC CE exists. For example, in the existing LTE system, if LCID is set to 11101, it indicates that MAC CE, which includes a short BSR, exists. If LCID is set to 11110, it indicates that MAC CE, which includes a long BSR, exists. Particularly, information for value used for the LCID may be indicated as following table 13 and table 14. Table 13 indicates information on value used for LCID for DL-SCH, Table 14 indicates information on value used for LCID for UL-SCH.

TABLE 13

| Index | LCID values |
| --- | --- |
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE 14

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the meantime, the user equipment transmits a buffer status report (BSR) to the base station if a BSR trigger condition is satisfied. In the current LTE system, predetermined BSR trigger conditions are defined.

If the buffer status report (BSR) is triggered by the aforementioned predetermined conditions, the user equipment identifies a buffer status, that is, buffer size for each LCG. At this time, the buffer size is a total sum of data on standby for transmission in a PDCP buffer and RLC in each logical channel. The buffer size for one logical channel group (LCG) means a total sum of data on standby for transmission in a buffer of every logical channel which belongs to the LCG.

If the buffer size for each LCG is identified, the user equipment allows a buffer size index corresponding to the identified buffer size to be included in a buffer size field of the buffer status report (BSR). Since the buffer size field is set to 6 bits, the buffer size of the LCG is reported by one of a total of 64 ranges.

The small-cell environments to which the embodiments will be applied can be defined as follows.

4. Small-Cell Environment

The term "cell" described in the embodiments is basically composed of downlink resources, and is selectively combined with uplink resources (See Paragraph 2). In this case, a linkage between a carrier frequency for DL resources and a carrier frequency for UL resources is definitely described in system information (SI) applied to DL resources.

The term "cell" is a coverage of the eNB so that the cell may indicate a specific frequency region or a specific geographical region. However, the cell may be used in the same meaning as in the eNB supporting a specific coverage for convenience of description and better understanding of the present invention. For example, the macro eNB, the macro cell, the small eNB, and the small cell may have the same meaning. However, if the cell and the eNB are explicitly distinguished from each other, the cell may be used as the original meaning.

In order to more stably guarantee data services such as multimedia in the next-generation wireless communication system, user interests for the technology devised to introduce either a hierarchical cell structure {in which small cells (e.g., a micro cell, a pico cell, and/or a femto cell) for low-power/short-distance communication are mixed} or a heterogeneous cell structure into a homogeneous network based on a macro cell are rapidly increasing. If an additional macro cell is installed for the legacy eNB arrangement, this additional macro cell installation is inefficient in terms of costs and complexity with respect to system throughput improvement.

It is assumed that the cell to which the following embodiments are applied is a small cell unless otherwise mentioned. However, the cell (e.g., a macro cell) used in a general cellular system may also be applied to the present invention. In addition, technical items described in first to third paragraphs may be applied to the following embodiments.

Contention based UL transmission will hereinafter be described in detail.

A control plane (C-Plane) may be largely classified into an idle mode and a connected mode. The idle mode may indicate that the UE is not connected to the eNB. That is, the idle mode may indicate that RRC connection is not performed. The UE performs a low-power consumption operation at intervals of a discontinuous reception (DRX) period during the idle mode, and at the same time monitors not only system information being broadcast through a broadcast channel (BCH) but also paging information. The connection mode may indicate a connection state between the UE and the eNB. That is, the connected mode may indicate that RRC connection has already been achieved. Since connection between the UE and the eNB is formed, data transmission/reception may be achieved in two ways.

In addition, in order to minimize consumption power of the UE during the connected mode, a dormant status and an active status may be defined. Actually, if data transmission/reception is not achieved during a predetermined time or longer during the active state in which data is actually transmitted or received, the UE is switched from the active status to the dormant status, so that power consumption can be minimized. In the dormant status, the UE may monitor a control channel according to DRX/DTX (Discontinuous Transmission) period. UE of the dormant status is switched to the UE of an active status at an on-duration time in which the dormant UE can receive a PDCCH during the DRX period. The active-mode UE may monitor the PDCCH. If the active-mode UE successfully decodes the PDCCH, the active status is maintained. If the PDCCH is not decoded, the active-mode UE is switched again to the dormant status. The dormant status and the active status of the UE are managed by MAC (Media Access Control)/RLC(Radio Link Control).

FIG. 17 is a conceptual diagram illustrating a method for performing switching from a dormant status to an active status.

Requirements of the C-Plane latency in 3GPP LTE-A will hereinafter be described with reference to FIG. 17(a).

Referring to FIG. 17(a), 3GPP LTE-A requires a transition time of 50 ms or less so as to perform switching from the idle mode to the connected mode. In this case, the transition time may include a configuration time of U-Plane (User Plane). In addition, it is necessary for the transition time from the dormant status to the active status during the connected mode to be set to 10 ms or less.

FIG. 17(*b*) is a flowchart illustrating a detailed procedure for performing switching from the dormant status to the active status. The transition time from the dormant status to the active status will hereinafter be described with reference to FIG. 17. Table 15 and Table 16 exemplarily illustrate a transition time from the UL-initiated dormant status to the active status.

TABLE 15

| Component | Description | Time [ms] |
|---|---|---|
| 1 | Average delay to next SR opportunity (1 ms PUCCH cycle) | 0.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 9.5 |

TABLE 16

| Component | Description | Time [ms] |
|---|---|---|
| 1 | Average delay to next SR opportunity (5 ms PUCCH cycle) | 2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 11.5 |

Referring to Tables 15 and 16, a total transition time for the dormant-status UE may range from an average time (component 1) that waits for a subframe needed for SR transmission to an uplink data transmission time (component 6) based on a specific time at which the UE desires to perform UL transmission. Respective components of Tables 15 and 16 may correspond to respective procedures of FIG. 17. The UE that is scheduled to be transition from the dormant status to the active status may first transmit the SR to the eNB through PUCCH format 1. After the UE receives the UL grant from the eNB, a signal for indicating a buffer status over a PUSCH is applied to the eNB. The UE synchronized by Tables 15 and 16 can be transitioned from the dormant status to the active status within 9.5 ms or 11.5 ms. The above-mentioned transition time is a transition time achieved when the SR transmission period is set to a minimum time (i.e., 1 ms or 5 ms). That is, if the SR transmission period is set to 5 ms, although the above period is set to a minimum time, it is impossible to meet a requirement condition of 10 ms or less corresponding to a transition time from the dormant status requested by LTE-A to the active status, and the contention based UL transmission is required to overcome the requirement condition or 10 ms or less.

FIG. 18 is a flowchart illustrating a scheduling request (SR) procedure according to an embodiment of the present invention.

In the LTE system, the data transmission/reception (Tx/Rx) method based on the eNB scheduling is used to maximize resource utility. That is, in order for the UE to transmit data to the network, it is necessary for the UE to receive radio resources. Meanwhile, in order to allow the LTE system to efficiently use UL radio resources, it is necessary for the eNB to recognize what kind of data will be transmitted on uplink for each UE and how much data will be transmitted on uplink for each UE. Therefore, the UE may directly transmit information on UL data to the eNB, and the eNB may allocate UL resources to the corresponding UE on the basis of the UL data information. In this case, the UL data information transmitted from the UE to the eNB indicates the amount of UL data stored in the buffer of the UE. The UL data information is referred to as a buffer status report (BSR). If the UE desires to transmit data on uplink, the UE may perform BSR for the eNB so as to request radio resources for UL data transmission.

FIG. 18 is a flowchart illustrating a resource allocation procedure for UL data transmission according to an embodiment of the present invention. FIG. 18(*a*) shows a five-stage resource allocation procedure for UL data transmission, and FIG. 18(*b*) shows a three-stage resource allocation procedure for UL data transmission.

Referring to FIG. 18(*a*), the UE may transmit the SR message to the network so as to receive necessary radio resources in step 1. In step 2, in order to allocate radio resources to the UE, the network having received the SR message from the UE may transmit the UL grant to the UE over a PDCCH. That is, the UE may receive a transfer block (TB) as a radio resource for BSR transmission. In step 3, the UE may transmit the BSR to the eNB using the allocated radio resources. In step 4, the eNB having received the BSR may re-allocate radio resources to the UE on the basis of BSR, and may transmit the UL grant for actual data transmission to the UE over a PDCCH. In step 5, the UE may transmit actual data to the eNB through the newly allocated radio resources.

Referring to FIG. 18(*b*), the SR message for receiving necessary radio resources is transmitted to the network along with the BSR. In this case, step 2 and step 3 of FIG. 18(*a*) may be omitted. In step 2, the eNB having received the BSR may re-allocate radio resources to the UE on the basis of BSR, and may transmit the UL grant for actual data transmission to the UE over a PDCCH. In step 3, the UE may transmit actual data to the eNB through the newly allocated radio resources.

As described above, in the LTE system, the data transmission/reception (Tx/Rx) method based on the eNB scheduling may be used to maximize resource utility. If the UE transmits data to the eNB, the UE may first request UL resource allocation from the eNB, and the UE may also transmit data only using UL resources allocated from the eNB. Therefore, according to the above-mentioned UL data transmission, the latency caused by resource allocation from the eNB may unavoidably increase.

The contention-based PUSCH zone is defined to minimize the latency encountered in a C-Plane of the UE. Therefore, the UE located in the cell in which the contention-based PUSCH zone is configured may transmit data using the corresponding zone without scheduling of the eNB, when UL data requesting low latency is transmitted. On the other hand, the contention-based PUSCH zone proposed by the present invention may be limited only to UL data (e.g., RRC/NAS request message for random access, BSR message for BSR, or transmission of actual data) transmitted within a specific procedure. When the eNB successfully detects the contention-based PUSCH zone, the eNB may transmit the UL grant in such a manner that the corresponding UE can enter the active status. The contention-based PUSCH zone (hereinafter referred to as a CP zone) and the contention PUSCH resource block (hereinafter referred to as CPRB) will hereinafter be described in detail.

Definition of CP Zone and CPRB

Figure 19:
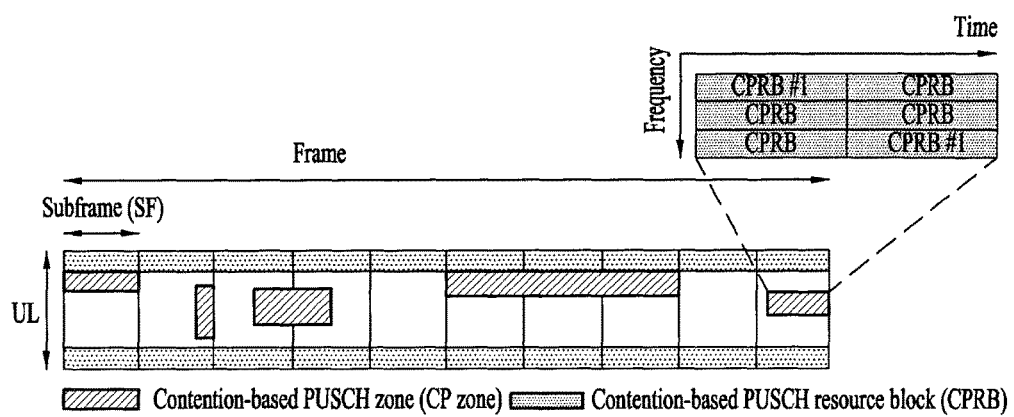
FIGS. 19 and 20 are conceptual diagrams illustrating a contention-based uplink according to an embodiment of the present invention.
Figure 20:
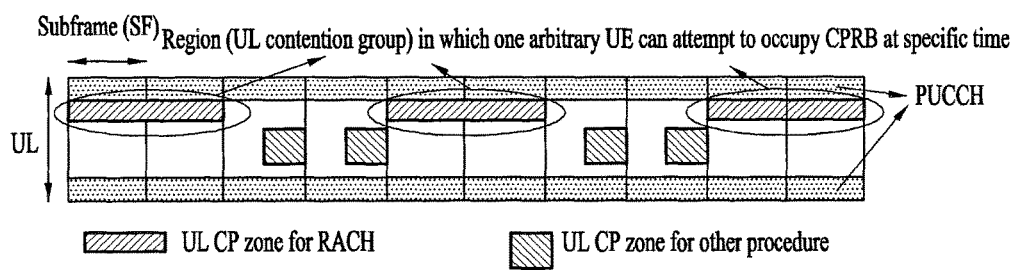

FIGS. 19 and 20 are conceptual diagrams illustrating a contention-based uplink.

Referring to FIG. 19, the CP zone may be allocated to a specific resource region within PUSCH for UL data transmission. For example, the CP zone may be allocated to one subframe or contiguous subframes. In addition, a resource region capable of being occupied by one arbitrary UE within a specific resource region is defined as a contention-based PSUCH resource block (CPRB). That is, N CPRBs may be defined in one CP zone.

Referring to FIG. 20, the UE may attempt to occupy the CPRB at a specific time. In this case, a specific region in which an arbitrary UE can attempt to occupy the CPRB at a specific time is referred to as a UL contention group. The UL contention group may include M CP zones. One CP zone may include N CPRBs capable of being occupied by the UE. In this case, (N×M) may indicate the number of CPRBs (hereinafter referred to as candidate CPRBs) through which one UE can be selected in the corresponding contention group at a specific time.

If a contention group is configured in two subframes and one CP zone is defined on a subframe basis, (2×N) candidate CPRBs can be occupied by the UE of the corresponding contention group. That is, the UE may have 2N candidate CPRBs, and may transmit data through at least one CPRB from among the 2N candidate CPRBs without receiving the UL grant. For example, if 2 zones each having 4 CPRBs are contained in one contention group, the UE may have (N×M) candidate CPRBs (where N×M=8). Meanwhile, the UE can transmit data through one CPRB from among 2N candidate CPRBs without receiving the UL grant, and has to separately acquire information needed for transmission of data to be transmitted through the legacy UL grant.

A method for configuring the CP zone for the scheduling request procedure will hereinafter be described in detail.

Method for Transmitting Information Related to CP Zone

In accordance with the present invention, a specific cell may transmit information regarding the CP zone to the UE. It is necessary for the specific cell to inform the UE that the corresponding cell is a cell having the CP zone. In addition, in order for the UE to transmit data without receiving the UL grant, it is necessary for the eNB to inform the UE of information needed for transmission of the above data according to another method. Information regarding the CP zone may include information indicating that the above specific cell is a cell having the CP zone or other information needed for data transmission using the CP zone. Four methods for transmitting information regarding the CP zone will hereinafter be described in detail. The above information is one of cell common information pieces, so that this can be transmitted as one of the system information. In more detail, the CP zone information may be used as a broadcasting message (e.g., system information or Master Information Block (MIB), etc.), and may be transmitted from the BS or eNB. If necessary, the CP zone message is defined as a unicast message for a specific UE, and may then be transmitted. Preferably, the specific cell may be a small cell.

First Scheme: The CP zone information may be transmitted through the MIB transmitting essential physical layer information. In this case, the CP zone information may be transmitted through a field added to the MIB.

Second Scheme: The CP zone information may be transmitted through a conventional system information block (SIB). In this case, the conventional system information block may be referred to as SIB-x. The CP zone information may be transmitted through SIB-x (e.g., SIB-1, SIB-2, etc.) as necessary. Preferably, if the CP zone is configured for random access, the CP zone information may be requisite for initial network access, so that this CP zone information may be transmitted through SIB-2. That is, if the CP zone is configured for the random access procedure, the CP zone information may be contained in the legacy SIB2 so that it may be transmitted from the eNB to the UE. Therefore, the UE having received the above message may previously recognize that the UE can be connected to the cell by transmitting the RRC connection request message through the CP zone.

Third Scheme: Information regarding the CP zone may be transmitted through a new SIB. In this case, this new SIB is referred to as SIB-y. For example, if the CP zone is configured for the procedure located after the network access, the CP zone information may be transmitted through a newly defined SIB. In this case, the eNB may previously inform the UE that a specific cell connected to the UE is a cell that has to receive the new SIB. This information message may be transmitted through MIB or SIB. Preferably, the SIB may be SIB1 or SIB2.

Fourth Scheme: The above-mentioned information may be transmitted through a new control message according to the unicast scheme. If the UE is connected to the corresponding cell, the corresponding zone information may be received only by the UE that desires to use the CP zone.

Transmission of the CP zone information is not limited to the above-mentioned scheme, and the proposed scheme may be transmitted by a combination scheme.

Detailed information contained in the CP zone information will hereinafter be described in detail.

Information (Parameter, Information) Transmitted for CP Zone Configuration

The CP zone proposed by the present invention may be defined as at least one CP zone according to the purpose (for example, CP zone for random access procedure or CP zone for BSR). That is, at least one of the plurality of CP zones may be configured for the same procedure. The at least one CP zone is configured for the same procedure, information regarding the at least one CP zone may be defined as information regarding a single CP zone. In the meantime, the CP zone information may include at least one of the following information 1) or 2).

1) UL Resource Information in which CP Zone is Configured

Information regarding the CP zone contained in SIB and MIB may include UL resource information in which the CP zone is configured. For example, UL resource information may include information regarding the number (N) of CPRBs capable of being occupied by a plurality of UEs in the single Cp zone, as shown in FIG. 10. In addition, the UL resource information may include information regarding the number (M) of CP zones that may be desired by one arbitrary UE attempting to occupy resources at a specific time. As described above, (N×M) may indicate the number of candidate CPRBs, each of which can be selected by one arbitrary UE at a specific time. That is, the UE may include (N×M) candidate CPRBs. In the meantime, the eNB may not configure the corresponding zone in all UL subframes in consideration of resource usages.

2) Information Requisite for Transmission of Data Capable of being Transmitted to the Configured CPRB CP zone information contained in at SIB and MIB may include information needed for transmission of data capable of being applied to the configured CPRB. Information needed for data transmission may include information transmitted through the legacy UL grant.

At least one of a maximum RB (resource block) size, MCS (Modulation and Coding Scheme) level, an initial transmission power reference per UE may be defined as information needed for transmission of data capable of being applied to the configured CPRB. In the meantime, information needed for data transmission may be configured for all UEs accessing the cell.

Method for Configuring CP Zone

The method for configuring the CP zone for buffer status report will hereinafter be described. In the scheduling request for use in the case in which the CP zone is not configured, the buffer status report can be performed only in the case in which the UL grant is received after scheduling request. On the other hand, if performing scheduling request procedure, the UE may transmit message for buffer status report using the same time as in the scheduling request or using the successive time resources. That is, if the CP zone is configured for the scheduling request (particularly, buffer status report), the scheduling request message and buffer status report may be transmitted using the same TTI (Transmit Time Interval), a neighbor TTI, other TTIs, etc. The relationship between scheduling request and the CP zone will hereinafter be described.

Referring to FIG. 21, a detailed method for configuring the CP zone for the buffer status report according to one embodiment will hereinafter be described. FIG. 21(a) shows the intra subframe configuration scheme, FIG. 21(b) shows the inter subframe configuration scheme, and FIG. 21(c) shows the mixed scheme of FIG. 21(a) and FIG. 21(b).

The SR and CP zones may be configured using the intra subframe configuration scheme and the inter subframe configuration scheme. Alternatively, two schemes may be combined as necessary.

Referring to FIG. 21(a), the SR and CP zones may be configured according to the intra subframe configuration scheme. According to the intra subframe configuration scheme, the SR and the CP zone for BSR may be simultaneously transmitted in the same subframe. That is, the SR and the BSR may be transmitted in one subframe. This situation may be represented by transmission within one TTI. In this case, the TDM (Time Division Multiplex) or FDM (Frequency Division Multiplex) scheme may be used as necessary.

Referring to FIG. 21(b), the PRACH and the CP zone may be configured according to the inter subframe configuration scheme. According to the inter subframe configuration scheme, the SR and the CP zone for BSR are transmitted at different contiguous subframes. After the SR is transmitted at a single subframe, the CP zone (or BSR) for buffer status reporting (BSR) may be transmitted in a subsequent subframe. That is, the SR and the CP zone for BSR may be transmitted at two TTIs.

In addition, the SR and the CP zone for BSR may be configured by combination of the above two schemes as shown in FIG. 21(c). For example, although the SR is configured per subframe, the CP zone may be configured at intervals of two subframes.

The SR and the CP zone for BSR may be configured in various ways according to the cell management scheme. On the other hand, ii order to maximize utility of resources contained in the cell, the SR and the CP zone for BSR may not be configured at a specific subframe. System latency may be minimized using the above-mentioned CP zone definition and a method for configuring the CP zone.

The SR procedure on the assumption that the CP zone is configured for BSR will hereinafter be described in detail.

FIG. 22 is a flowchart illustrating the comparison result of the SR procedure according to whether the CP zone is configured.

It is assumed that the SR procedure for use in the case in which the CP zone shown in FIG. 22(a) is not configured is divided into 5 stages, so that the 5-stage SR procedure is performed.

Referring to FIG. 22(a), if the CP zone is not configured, the UL data transmission procedure is divided into 5 stages. However, if the CP zone is configured for Buffer Status Report (BSR), the UL data transmission procedure may be reduced to three stages as shown in FIG. 22(b). That is, after the UE receives system information including information regarding the CP zone for BSR from the eNB, the UL grant for BSR is not received and the BSR may be immediately performed. Therefore, if the CP zone is configured, latency consumed for receiving the UL grant for BSR can be reduced.

In this case, SR is transmitted over a PUCCH in the same manner as in the on-off keying scheme, and it is assumed that PUCCH resources for each UE are pre-allocated.

On the other hand, in order to support not only the 5-stage SR transmission scheme shown in FIG. 22(a) and the 3-stage SR transmission scheme shown in FIG. 22(b), the SR may include a specific indicator for indicating the SR transmission scheme. For example, if the specific indicator is set to zero (0), the specific indicator may indicate the non-contention based SR transmission scheme shown in FIG. 22(a). If the specific indicator is set to 1, the specific indicator may indicate the contention based SR transmission scheme shown in FIG. 22(b).

The effects achieved when the CP zone is configured for BSR will hereinafter be described with reference to FIG. 23.

Referring to FIG. 23(a), if the CP zone is not configured, the UE configured to perform the contention-based SR procedure may transmit the SR. The network having received the SR may transmit the UL grant to the UE over a PDCCH so as to allocate radio resources. That is, the UE may receive a transfer block (TB) as a radio resource for BSR transmission. In Component 6, the UE may transmit the BSR to the eNB using the allocated radio resources. In Component 8, the eNB having received the BSR may reallocate the radio resources to the UE, and may transmit the UL grant for actual data transmission to the UE over a PDCCH. In this case, a total latency up to the Component 10 is about 17.5 [ms] or 19.5 [ms] as shown in the following Table 17.

TABLE 17

| Component | Description | Time [ms] |
| --- | --- | --- |
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of BSR | 1 |
| 7 | UE Processing Delay (decoding of scheduling grant + L1 encoding of UL data) | 3 |

TABLE 17-continued

| Component | Description | Time [ms] |
|---|---|---|
| 8 | Transmission of Scheduling Grant | 1 |
| 9 | UE Processing Delay (decoding of scheduling grant + L1 encoding of UL data) | 3 |
| 10 | Transmission of actual Data | 1 |
| | Total delay | 17.5/19.5 |

Referring to FIG. 23(b), if the CP zone is configured, the UE configured to perform the contention-based SR procedure may transmit the SR. In this case, the BSR is also transmitted at a subframe contiguous to the SR or at the same subframe as in the SR (Component 3). The network having received the SR and the BSR may transmit the UL grant to the UE over a PDCCH so as to allocate radio resources (Component 5). That is, the UE may receive a transfer block (TB) as a radio resource for actual data transmission. In Component 6, the UE may transmit actual data to the eNB using the allocated radio resources (Component 7). In this case, a total latency up to the component 7 is about 9.5 [ms] or 11.5 [ms] as shown in the following Table 18.

TABLE 18

| Component | Description | Time [ms] |
|---|---|---|
| 1 | Average delay to next SR opportunity (1 ms/5 ms PUCCH cycle) | 0.5/2.5 |
| 2 | UE sends Scheduling Request | 1 |
| 3 | Transmission of BSR | 0 |
| 4 | UE Processing Delay (decoding of scheduling grant + L1 encoding of UL data) | 3 |
| 5 | Transmission of Scheduling Grant | 1 |
| 6 | UE Processing Delay (decoding of scheduling grant + L1 encoding of UL data) | 3 |
| 7 | Transmission of actual|data | 1 |
| | Total delay | 9.5/11.5 |

That is, if the CP zone is configured, latency caused by the configured CP zone is compared with latency achieved before the CP zone is configured, so that the latency can be reduced by about 8 [ms].

However, since a plurality of UEs configured to perform the SR procedure occupies resources through contention, a collision may occur in the process for occupying the corresponding resources. Therefore, a method for occupying the contention based UL resources so as to prevent such collision will hereinafter be described in detail.

FIG. 24 is a conceptual diagram illustrating a method for occupying the contention based resource block on the basis of UL physical resources according to an embodiment of the present invention.

In association with the relationship between the CPRB and the SR, as many CPRBs as the number of SRs may be equally configured in such a manner that the SR is mapped to the CPRB on a one to one basis, or the number of CPRBs may also be less than the number of SRs as necessary.

In this case, if N SRs may be allocated to one subframe, it is assumed that the CP zone having N or more CPRBs is configured. That is, the SR and the CPRB may be mapped to each other on a one to one basis.

FIG. 24(a) is a conceptual diagram illustrating a method for occupying the resource block according to a physical index when the number of CPRBs is equal to or higher than the number of SRs. In this case, although FIG. 24(a) shows that the SR and the CPRB are configured according to the intra subframe configuration scheme, the following items may also be applied to the inter subframe configuration scheme or the mixed scheme.

If as many CPRBs as the number of SR resources allocated in one or more subframes are defined, the CPRB and the SR are mapped to each other on a one to one basis, so that the mapping operation may be achieved without collision between the SR and the CPRB. In this case, the CPRB may be set to a CPRB having the same index as in a PUCCH physical index for SR. If the SR is allocated to the resource corresponding to Index 3, the corresponding UE may also transmit a message (e.g., BSR) to be transmitted using the CPRB corresponding to CPRB #3. In this case, the physical index may indicate a PUCCH resource index from among the SR configuration information elements.

However, CPRB may be allocated using a logical index of the SR instead of a physical index as necessary.

FIG. 24(b) is a conceptual diagram illustrating a method for occupying a resource block according to a logical index when the number of CPRBs is equal to or higher than the number of SRs.

On the other hand, although FIG. 24(a) shows that the SR and the CPRB are configured according to the inter subframe configuration scheme, it should be noted that the following items can be applied to the intra subframe configuration scheme or the mixed scheme.

If as many CPRBs as the number of SR resources allocated in one or more subframes are defined, the CPRB and the SR are mapped to each other on a one to one basis, so that the mapping operation may be achieved without collision between the SR and the CPRB. In this case, the CPRB may be set to a CPRB having the same index as in a PUCCH physical index for SR. If the logical index of the SR-allocated resource is set to zero (0), the corresponding UE (UE 1 of FIG. 24(b)) may transmit a desired message (e.g., BSR) through a CPRB corresponding to CPRB #0 having the same index as the above logical index.

In this case, the PUCCH logical index may indicate the index achieved when the PUCCH resource index allocated for SR of UEs in the corresponding subframe is logically mapped from 0. This means that the above-mentioned SR configuration information element must be newly defined and transmitted. Therefore, the eNB may also inform the UE of the logical index of the SR during SR transmission. The logical index may be implicitly or explicitly indicated.

On the other hand, if N SRs are allocated to one subframe, it is assumed that the CP zone having a smaller number of CPRBs than N is configured. That is, the above-mentioned situation may indicate that the SR and the CPRB are not mapped to each other on a one to one basis.

If the number of CPRBs is less than the number (N) of SRs, a collision may occur in BSR transmission. In addition, as the number of UEs that simultaneously transmit data and perform BSR increases, there is a higher possibility of causing the contention-based UL resource collision between UEs during the CPRB occupying process.

A method for minimizing the collision encountered in the resource occupying process when the CP zone is configured will hereinafter be described.

(1) Arbitrary Selection Method: The arbitrary selection method may select the CPRB to arbitrarily report a buffer status.

(2) Selection method based on UE ID: Each UE may select the CPRB on the basis of a UE ID. In this case, the relationship between the UE-selected CPRB and the UE ID may be represented by the following equation 2.

(Index of UE-selected CPRB block)=(UE ID)mod $X$    [Equation 2]

The index of the UE-selected CPRB block (or the index of contention-based resources) may be achieved when the selected UE ID is modulo-operated by X. That is, the UE-selected CPRB block may correspond to a remainder value obtained when the UE ID is divided by X, where X is the number of CPRB blocks capable of being occupied by the UE configured to perform the SR procedure. The UE may obtain the X value through system information. In this case, the UE ID is a parameter capable of identifying a subscriber, and may be a single universal UE ID. For example, the UE ID may be an International Mobile Subscriber Identity (IMS), a Globally Unique Temporary Identifier (GUTI), an SAE Temporary Mobile Subscriber Identity (S-TMSI), an IP address (PDN (Packet Data Network) address), etc. Alternatively, for example, a parameter used to identify each UE for use in the cell may be a C-RNTI. That is, this parameter can be applied to a UE ID that is used in the cellular network in various ways.

The method for selecting the CPRB on the basis of the UE ID may also be applied to other procedures instead of the SR procedure.

(3) Selection Method based on UL physical resource index for SR: Each UE may select the CPRB on the basis of UL physical resource index for the SR. In this case, the relationship between the UE-selected CPRB and the UL physical resource index for the SR is represented by the following equation 3.

$$\text{(Index of UE-selected CPRB block)}=\text{(UL physical resource index for SR)} \bmod X \quad \text{[Equation 3]}$$

The index of the UE-selected CPRB block (or the index of contention-based resources) may be achieved when the UL physical resource index for SR is modulo-operated by X. That is, the UE-selected CPRB block index may correspond to a remainder value obtained when the UL physical resource index for the UE-selected SR is divided by X, where X is the number of CPRB blocks capable of being occupied by the UE configured to perform the SR procedure. The UE may obtain the X value through system information. In this case, the UL physical resource index for SR may indicate a specific value corresponding to the PUCCH resource index from among SR configuration information elements.

(4) Selection Method based on UL physical resource index for SR: Each UE may select the CPRB on the basis of UL physical resource index for the SR. In this case, the relationship between the UE-selected CPRB and the UL physical resource index for SR is represented by the following equation 4.

$$\text{(Index of UE-selected CPRB block)}=\text{(UL physical resource index for SR)} \bmod X \quad \text{[Equation 4]}$$

The index of the UE-selected CPRB block (or the index of contention-based resources) may be achieved when the UL physical resource index for SR is modulo-operated by X. That is, the UE-selected CPRB block index may correspond to a remainder value obtained when the UL physical resource index for the UE-selected SR is divided by X, where X is the number of CPRB blocks capable of being occupied by the UE configured to perform the SR procedure. The UE may obtain the X value through system information. In this case, the PUCCH logical index may indicate the index achieved when the PUCCH resource index allocated for SR of UEs in the corresponding subframe is logically mapped from 0. This means that the above-mentioned SR configuration information element should be newly defined and transmitted.

As described above, if the number of CPRBs is less than the number of SRs, and if a specific value that does not correspond to a divisor of N indicating the number of SRs is set to X, a plurality of UEs may more frequently select a specific CPRB. As a result, there may be a higher possibility of causing collision. Therefore, it is preferable that X is defined as a divisor of N indicating the number of SRs. However, the scope or spirit of the present invention is not limited thereto. For example, if N is set to 6, it is preferable that X is set to any one of 1, 2, 3, and 6.

As described above, if it is assumed that the number of SRs allocated to a PUCCH of an arbitrary subframe is set to N and the number of CPRBs for transmission of the corresponding BSR is set to N, there is a low possibility of causing a collision between one UE and the other UE when the UE transmits the BSR to CPRB.

Figure 25:
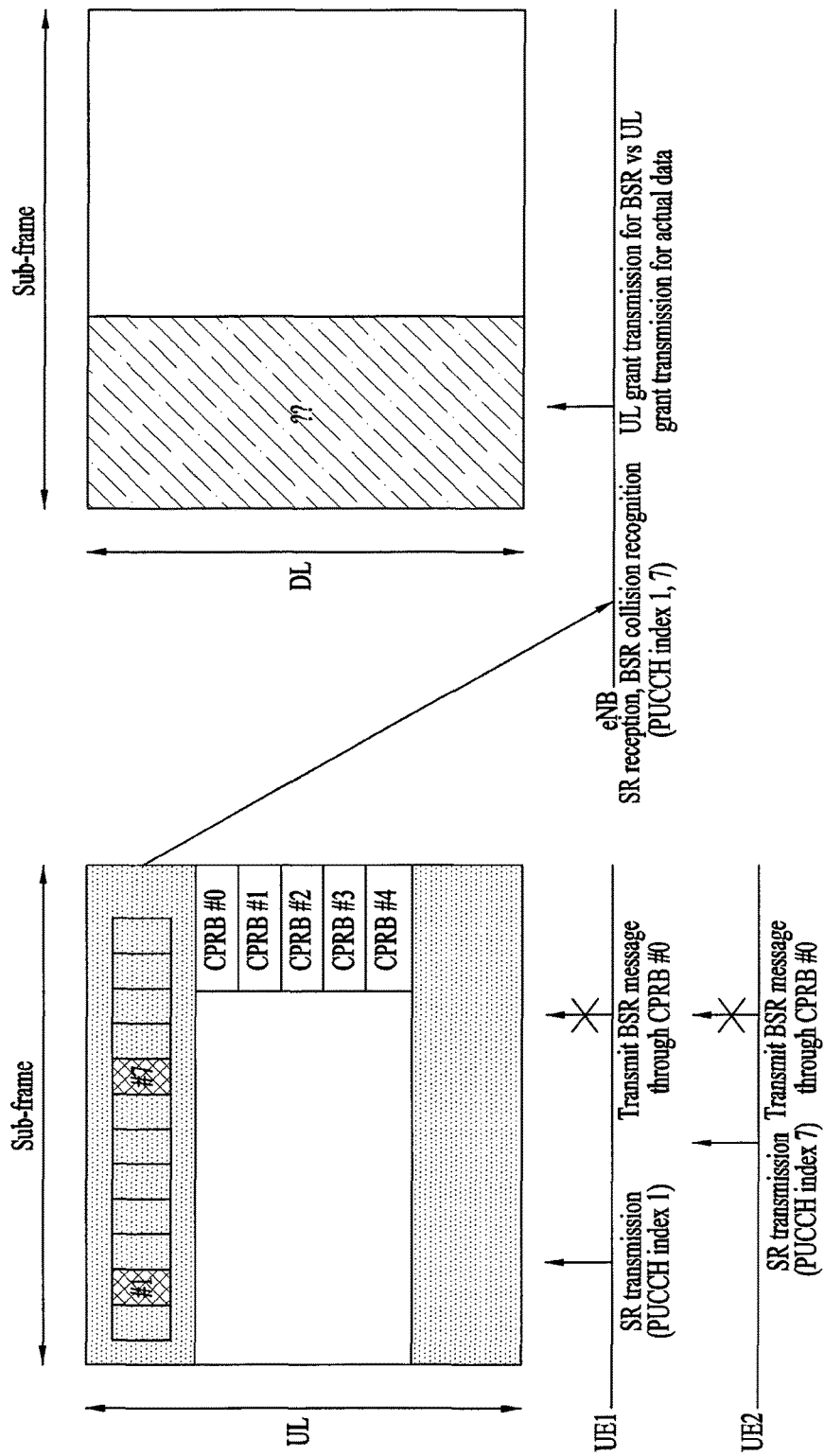
FIG. 25 is a conceptual diagram illustrating the problems encountered by methods for occupying the contention-based resource block based on uplink physical resources.

On the other hand, in association with N SRs allocated to PUCCH, if the number of CPRBs needed for BSR transmission is set to N-1 or less, one or more other UEs may simultaneously transmit the BSR through a CPRB occupied by a specific UE. For example, if UE 1 and UE 2 simultaneously transmit the SR as shown in FIG. 25, it may be assumed that a PUCCH index of SR allocated to UE 1 is set to 1 and a PUCCH index allocated to UE 2 is set to 7. As described above, if each UE arbitrarily selects the CPRB, UE 1 and UE 2 may select the CPRB corresponding to the CPRB index 1 so as to implement BSR transmission.

In this case, the network may receive the SR for UE 1 through a PUCCH resource corresponding to PUCCH index 1, and may receive the SR for UE 2 through a PUCCH resource corresponding to PUCCH index 7. However, the BSR for each UE is transmitted through the same CPRB resource (CPRB #1), so that the network can recognize the occurrence of collision in BSR.

In this case, from the viewpoint of the network, information as to whether the UL grant for BSR will be transmitted when the UL grant is transmitted to the UE, or information as to whether the UL grant for actual data will be transmitted when the UL grant is transmitted to the UE may cause unexpected problems.

Since the eNB has already recognized the occurrence of collision, the operation for transmitting the BSR grant to each UE may be preferable. However, from the viewpoint of the UE, since resources are transmitted through the same CPRB, the eNB may not recognize whether the grant for BSR is transmitted, or may not recognize whether the grant for transmission of actual data is transmitted due to the absence of collision. Therefore, since the UE has already transmitted the BSR, information as to whether the BSR for the UL grant will be transmitted or information as to whether actual data will be transmitted may encounter unexpected problems. In addition, from the viewpoint of the eNB, if the UL grant for actual data is transmitted, there may occur an unexpected problem in deciding the amount of resources to be allocated for each UE.

A method for recognizing the collision when one or more UEs simultaneously transmit the BSR using the same resources, and a method for solving such collision are proposed by the embodiments of the present invention.

Figure 26:
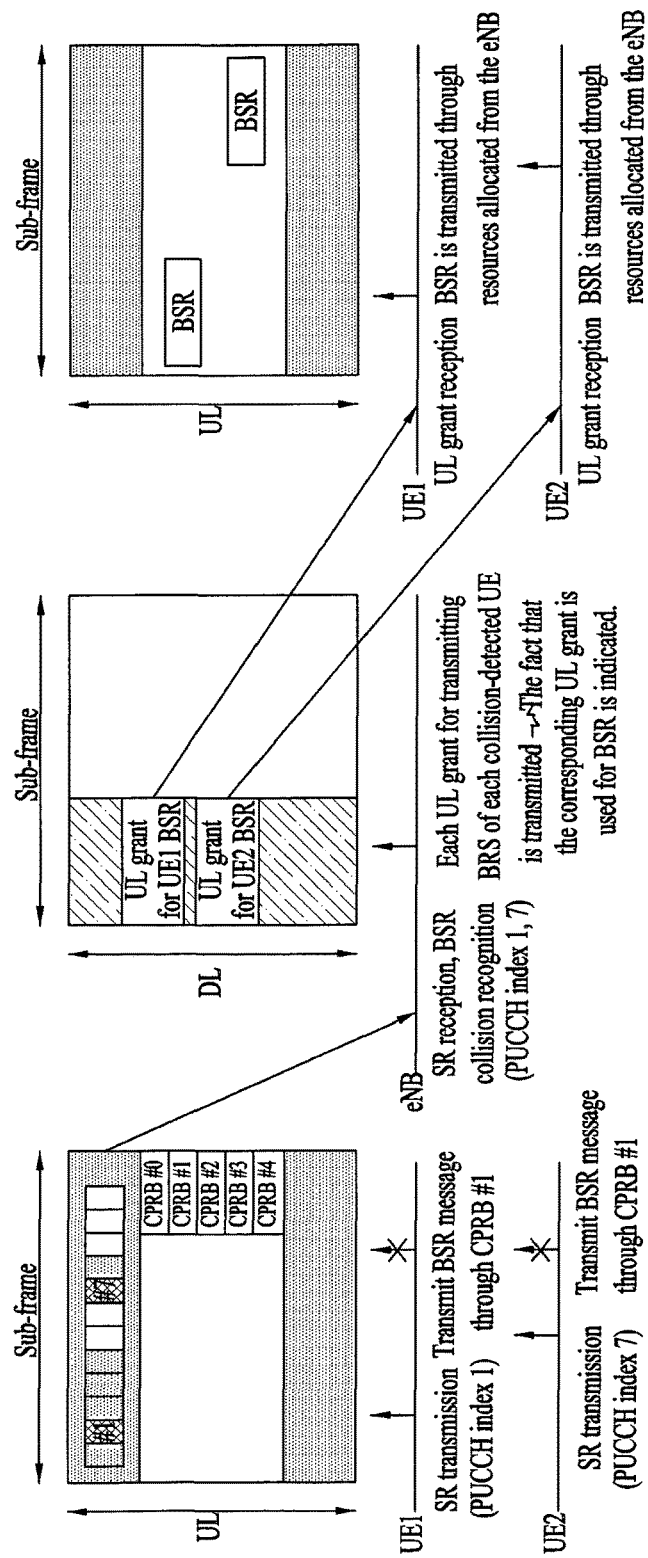
FIG. 26 is a conceptual diagram illustrating a method for transmitting/receiving an uplink grant when collision caused by occupied contention-based resources occurs according to another embodiment of the present invention.

FIG. 26 is a conceptual diagram illustrating the eNB operation for use in the case in which UEs simultaneously transmit the BSR using the same resources.

Referring to FIG. 26, the eNB having recognized the BSR collision transmits the UL grant, so that the eNB may command the corresponding UE to retransmit the BSR. That is, the eNB transmits the UL grant for BSR transmission. In this case, the eNB may also transmit an indication message for indicating resource allocation needed when the corresponding UL grant requests the BSR.

In more detail, as can be seen from FIG. 25, if UE 1 and UE 2 simultaneously transmit the SR, and if each UE arbitrarily selects the CPRB, UE 1 and UE 2 may select the CPRB corresponding to the CPRB index 1 so as to transmit the BSR. In this case, the eNB may receive the SR regarding UE 1 through a PUCCH resource corresponding to PUCCH index 1, and may receive the SR regarding UE 2 through a PUCCH resource corresponding to PUCCH index 7. However, the BSR for each UE is transmitted through the same CPRB resources, so a collision may occur in BSR.

Accordingly, in order to solve the problems caused by collision as shown in FIG. 25, the eNB has already recognized such collision, so that the UL grant for BSR transmission is transmitted to each UE, and the fact that the corresponding UL grant is used for BSR is indicated.

That is, if the BSR of the UE is successfully received through the CPRB, the UL grant for actual data is transmitted without using special indication. In contrast, if the SR is received from two or more UEs through a PUCCH resource and the BSR reception is failed, the UL grant for BSR is transmitted and at the same time the indication message indicating that the corresponding UL grant is used for BSR transmission is also transmitted.

If the UL grant and the indication message indicating that the corresponding uplink is used for BSR transmission are simultaneously received from the eNB, the UE may transmit the BSR through the resources allocated from the eNB.

Therefore, if collision occurs in BSR according to the above-mentioned CPRB selection method, errors caused by resource collision can be prevented from occurring according to transmission of the UL grant for BSR.

In addition, in the case of using the above-mentioned procedure, if the BSR is successfully transmitted, latency can be reduced. Although the BSR transmission failure occurs and the grant for BSR is received, this means that the latency is not greatly increased as compared to the related art. Therefore, according to the present invention, the effects of reducing the latency time using the contention-based UL resources can be obtained.

Figure 27:
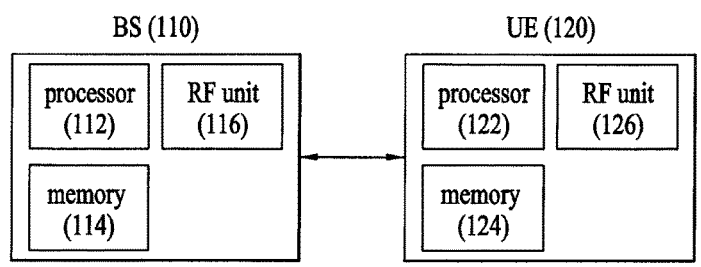
FIG. 27 is a block diagram for an example of a communication device according to one embodiment of the present invention.

FIG. 27 is a block diagram for an example of a communication device according to one embodiment of the present invention.

Referring to FIG. 27, a wireless communication system includes a BS 110 and a UE 120. When the wireless communication system includes a relay, the BS or UE can be replaced by the relay.

For downlink, transmitter may be part of the BS 110, and receiver may be part of the UE 120. For uplink, transmitter may be part of the UE 120, and receiver may be part of the BS 110.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It will be obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

The invention claimed is:

1. A method for transmitting a scheduling request (SR) at in a wireless communication system, the method performed by a first user equipment (UE) and comprising:
   receiving information related to a resource for the SR from a base station (BS);
   transmitting the SR to the BS over a control channel using the resource for the SR;
   transmitting a first buffer status report (BSR) to the BS over a data channel using a first uplink (UL) contention-based resource without receiving an UL grant for the first BSR,
   receiving a first UL grant for the first BSR from the BS if the first UL contention-based resource and a second UL contention-based resource are identical; and
   retransmitting the first BSR to the BS based on the received first UL grant,
   wherein the second UL contention-based resource is used by the BS to receive a second BSR from a second UE over a data channel without transmitting an UL grant for the second BSR, and
   wherein the first UL contention-based resource is determined based on at least the resource for the SR or an identifier of the first UE.

2. The method according to claim 1, further comprising:
   receiving a second UL grant from the BS if the first UL contention-based resource and the second UL contention-based resource are different; and
   transmitting data based on the received second UL grant.

3. The method according to claim 1, further comprising receiving the first UL contention-based resource based on an index of the resource for the SR.

4. The method according to claim 3, wherein:
   an index of the first UL contention-based resources is determined as (index of the resource for the SR) mod N;
   mod is a modulo operation; and
   N is a number of contention-based resources contained in one contention-based UL zone.

5. The method according to claim 3, wherein the index of the resource for the SR is a physical index of an UL resource through which the SR is transmitted.

6. The method according to claim 3, further comprising:
receiving a predetermined logical index from the BS,
wherein the index of the resource for the SR is the predetermined logical index mapped to a physical index of an UL resource through which the SR is transmitted.

7. The method according to claim 3, wherein:
an index of the first UL contention-based resources is determined as (first UE ID) mod X;
mod is a modulo operation; and
X is a number of contention-based resources contained in one contention-based UL zone.

8. A method for receiving a scheduling request (SR) in a wireless communication system, the method performed by a base station (BS) and comprising:
transmitting information related to a resource for the SR to a first user equipment (UE);
receiving the SR over a control channel from the first UE;
receiving a first buffer status report (BSR) from the BS over a data channel using a first uplink (UL) contention-based resource without transmitting an UL grant for the first BSR;
receiving a second BSR from a second UE using a second UL contention-based resource without transmitting an UL grant for the second BSR;
transmitting a first UL grant to the first UE if the first UL contention-based resource and the second UL contention-based resource are identical; and
receiving the first BSR from the first UE based on the first UL grant,
wherein the first uplink contention-based resource is determined based on at least one of the resource for the SR or an identifier of the first UE.

9. The method according to claim 8, further comprising:
transmitting a second UL grant to the first UE if the first UL contention-based resource and the second UL contention-based resource are different; and
receiving data from the first UE based on the first UL grant.

10. A first user equipment (UE) device for transmitting a scheduling request (SR) in a wireless communication system, the UE comprising:
a receiver configured to receive information;
a transmitter configured to transmit information; and
a processor configured to:
control the receiver to receive information related to a resource for the SR from a base station (BS);
control the transmitter to transmit the SR to the BS over a control channel using the resource for the SR;
control the transmitter to transmit a first buffer status report (BSR) to the BS over a data channel using a first uplink (UL) contention-based resource without receiving an UL grant for the first BSR;
control the receiver to receive a first UL grant for the first BSR from the BS if the first UL contention-based resource and a second UL contention-based resource are identical;
control the transmitter to retransmit the first BSR to the BS based on the received first UL grant,
wherein the second UL contention-based resource is a resource used by the BS to receive a second BSR from a second UE over a data channel without transmitting an UL grant for the second BSR, and
wherein the first UL contention-based resource is determined based on at least the resource for the SR or an identifier of the first UE.

11. The UE according to claim 10, wherein the processor is further configured to control the receiver to receive the first UL contention-based resource based on an index of the resource for the SR.

12. The UE according to claim 11, wherein the index of the resource for the SR is a physical index of an UL resource through which the SR is transmitted.

13. The UE according to claim 11, wherein:
the processor is further configured to control the receiver to receive a predetermined logical index from the BS; and
the index of the resource for the SR is the predetermined logical index mapped to a physical index of an UL resource through which the SR is transmitted.

14. The UE according to claim 11, wherein:
an index of the first UL contention-based resource is determined as (first UE ID) mod X;
mod is a modulo operation; and
X is a number of contention-based resources contained in one contention-based UL zone.

15. The UE according to claim 11, wherein:
an index of the first UL contention-based resource is determined as (index of the resource for the SR) mod N;
mod is a modulo operation; and
N is a number of contention-based resources contained in one contention-based UL zone.

16. The UE according to claim 10, wherein the processor is further configured to:
control the receiver to receive a second UL grant from the BS if the first UL contention-based resource and the second UL contention-based resource are different; and
control the transmitter to transmit data based on the received second UL grant.

17. A base station (BS) for receiving a scheduling request (SR), the BS comprising:
a transmitter configured to transmit information;
a receiver configured to receive information; and
a processor configured to:
control the transmitter to transmit information related to a resource for the SR to a first user equipment (UE);
control the receiver to receive the SR over a control channel from the first UE;
control the receiver to receive a first buffer status report (BSR) from the first UE over a data channel using a first uplink (UL) contention-based resource without transmitting an UL grant for the first BSR;
control the receiver to receive a second BSR from a second UE using a second UL contention-based resource without transmitting an UL grant for the second BSR;
control the transmitter to transmit a first UL grant to the first UE if the first UL contention-based resource and the second UL contention-based resource are identical; and
control the receiver to receive the first BSR from the first UE based on the first UL grant,
wherein the first uplink contention-based resource is determined based on at least the resource for the SR or an identifier of the first UE.

18. The BS according to claim 17, wherein the processor is further configured to:

control the transmitter to transmit a second UL grant to the first UE if the first UL contention-based resource and the second UL contention-based resource are different; and control the receiver to receive data from the first UE based on the first UL grant.

* * * * *